United States Patent
Blazejewski et al.

(10) Patent No.: US 10,669,455 B2
(45) Date of Patent: Jun. 2, 2020

(54) PRESSURE-SENSITIVE ADHESIVE STRIP

(71) Applicant: TESA SE, Norderstedt (DE)

(72) Inventors: Anna Blazejewski, Hamburg (DE); Axel Burmeister, Hamburg (DE); Franciska Lohmann, Hamburg (DE); Anika Petersen, Heidmühlen (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/674,765

(22) Filed: Aug. 11, 2017

(65) Prior Publication Data
US 2018/0163092 A1  Jun. 14, 2018

(30) Foreign Application Priority Data
Dec. 9, 2016  (DE) .......... 10 2016 224 578

(51) Int. Cl.
*C09J 7/38* (2018.01)
*C09J 11/08* (2006.01)
(Continued)

(52) U.S. Cl.
CPC .......... *C09J 11/08* (2013.01); *C09J 7/22* (2018.01); *C09J 7/255* (2018.01); *C09J 7/38* (2018.01);
(Continued)

(58) Field of Classification Search
None
See application file for complete search history.

(56) References Cited

U.S. PATENT DOCUMENTS 6,001,471 A * 12/1999 Bries ............. A47G 1/175
428/343
6,162,859 A  12/2000 Lu et al.
(Continued)

FOREIGN PATENT DOCUMENTS

CN   102363717 A   2/2012
CN   103602293 A   2/2014
(Continued)

OTHER PUBLICATIONS

EP Search Report for corresponding application EP 17182443.6-1102 dated Apr. 20, 2018 (English translation not available).
(Continued)

*Primary Examiner* — Frank D Ducheneaux
(74) *Attorney, Agent, or Firm* — Norris McLaughlin, P.A.

(57) ABSTRACT

The invention relates to a pressure-sensitive adhesive strip composed of at least three layers, comprising
an inner layer F composed of a non-extensible film carrier,
a layer SK1 composed of a self-adhesive composition arranged on one of the surfaces of the film carrier layer F and based on a vinylaromatic block copolymer composition foamed with microballoons,
a layer SK2 composed of a self-adhesive composition arranged on the opposite surface of the film carrier layer F from the layer SK1 and based on a vinylaromatic block copolymer composition foamed with microballoons,
where the mean diameter of the voids formed by the microballoons in the self-adhesive composition layers SK1 and SK2 is independently 20 to 60 μm.

22 Claims, 4 Drawing Sheets

Figure 1:
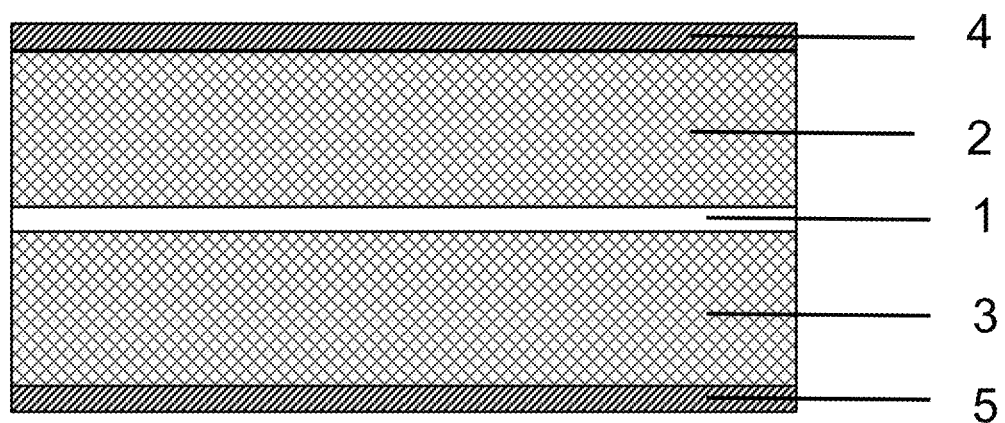

(51) Int. Cl.
*C09J 7/22* (2018.01)
*C09J 153/02* (2006.01)
*C08K 9/10* (2006.01)
*C09J 7/25* (2018.01)

(52) U.S. Cl.
CPC .............. *C09J 7/387* (2018.01); *C08K 9/10* (2013.01); *C09J 153/02* (2013.01); *C09J 2201/128* (2013.01); *C09J 2201/606* (2013.01); *C09J 2203/326* (2013.01); *C09J 2203/33* (2013.01); *C09J 2203/334* (2013.01); *C09J 2205/102* (2013.01); *C09J 2205/11* (2013.01); *C09J 2400/24* (2013.01); *C09J 2453/00* (2013.01); *C09J 2467/006* (2013.01); *C09J 2475/006* (2013.01)

(56) References Cited

U.S. PATENT DOCUMENTS

| | | |
|---|---|---|
| 7,070,051 B2 | 7/2006 | Kanner et al. |
| 2005/0064181 A1 | 3/2005 | Blank et al. |
| 2009/0181250 A1 | 7/2009 | Zmarsly et al. |
| 2011/0076430 A1 | 3/2011 | Shigematsu |
| 2011/0120615 A1 | 5/2011 | Zmarsly et al. |
| 2016/0285120 A1* | 9/2016 | Nakano ............... C09J 5/00 |
| 2018/0079937 A1 | 3/2018 | Blazejewski et al. |
| 2018/0112110 A1 | 4/2018 | Blazejewski et al. |
| 2018/0163099 A1 | 6/2018 | Blazejewski et al. |

FOREIGN PATENT DOCUMENTS

| | | |
|---|---|---|
| CN | 104919017 A | 9/2015 |
| DE | 102008004388 A1 | 7/2009 |
| DE | 102008056980 A1 | 5/2010 |
| DE | 102012223670 A1 | 6/2014 |
| DE | 102015206076 A1 | 10/2016 |
| EP | 0894841 B1 | 2/1999 |
| EP | 1308492 B1 | 5/2003 |
| EP | 2832780 A1 | 2/2015 |
| EP | 3075772 A1 | 10/2016 |
| JP | 2003241667 A | 8/2003 |
| JP | 201070655 A | 4/2010 |
| JP | 2010070655 A | 4/2010 |
| JP | 2011074133 A | 4/2011 |
| JP | 2012508287 A | 4/2012 |
| JP | WO2013176179 A1 | 1/2016 |
| TW | 200942590 A1 | 10/2009 |
| TW | 201641641 A | 12/2016 |
| WO | 03011954 A1 | 2/2003 |
| WO | 2009090119 A1 | 7/2009 |
| WO | 2009114683 A1 | 9/2009 |
| WO | 2010054944 A1 | 5/2010 |
| WO | 2010077541 A1 | 7/2010 |
| WO | 2010078396 A2 | 7/2010 |
| WO | 2011124782 A1 | 10/2011 |
| WO | 2016156307 A1 | 10/2016 |
| WO | 2017207119 A1 | 12/2017 |

OTHER PUBLICATIONS

English translation of TW Notification for the Opinion of Examination issued in corresponding TW application 106126835 dated May 22, 2018.
English translation of Korean Office Action issued in corresponding KR application 10-2017-0100329 dated Aug. 21, 2018.
English translation of Korean Office Action issued in related KR application 10-2017-0100311 dated Aug. 21, 2018.
German Search Report for corresponding application DE 10 2016 224 578.3 dated May 30, 2017.
English translation and KR Office Action issued in corresponding KR application 10-2017-0100329 dated Feb. 28, 2019.
English translation of CN Office Action issued in corresponding CN application 201710684343.8 dated Mar. 22, 2019.
Translation of Office Action dated Feb. 15, 2019, and issued in connection with Korean Patent Application No. 10-2017-0100311.
Search Report for European Patent Application No. 17182447.7, dated Feb. 22, 2018.
Translation of Office Action dated Sep. 26, 2018, and issued in connection with Japanese Patent Application No. 2017-155077.
Translation of Notification for the Opinion of Examination dated May 22, 2018, and issued in connection with Taiwanese Patent Application No. 106126836.
Search Report for German Patent Application No. 10 2016 224 735.2, dated May 30, 2017.

* cited by examiner

PRESSURE-SENSITIVE ADHESIVE STRIP

This application claims foreign priority benefit of German Patent Application No. DE 10 2016 224 578.3, filed Dec. 9, 2016, the disclosure of which patent application is incorporated herein by reference.

The invention relates to a pressure-sensitive adhesive strip.

Adhesive tapes are frequently used for the bonding of ultrasmall components, for example in devices in the consumer electronics industry. In order to enable this, it is necessary for the form of the adhesive tape section to be matched to the form of the component. In this case, difficult geometries are often also necessary, which are obtained by die-cutting of the adhesive tape. Thus, element widths in die-cut parts of a few millimeters or even less are by no means rare. On application of these sensitive adhesive tapes to the components, there is frequently deformation of the die-cut parts.

In order to suppress or at least reduce the deformation, it has been found to be advantageous to integrate a film, for example a PET film, into the adhesive tapes as a middle lamina in order to absorb the tensile forces on application.

Bonds with such adhesive tapes are increasingly also being used if the component is subject to shocks. Particularly shock-resistant bonds have been found to be those with pressure-sensitive adhesive strips having a viscoelastic, syntactically foamed core, a stabilizing film and, on the outer laminas, two self-adhesive bonding layers.

These pressure-sensitive adhesive strips are capable of such high performance that cohesive fracture within the pressure-sensitive adhesive strip is to be observed under shock. The bond between the foamed core and the stabilizing film fails, and foam and film are parted from one another.

Foamed pressure-sensitive adhesive composition systems have long been known and are described in the prior art.

In principle, polymer foams can be produced in two ways. One way is via the effect of a blowing gas, whether added as such or resulting from a chemical reaction, and a second way is via incorporation of hollow beads into the polymer matrix. Foams that have been produced by the latter route are referred to as syntactic foams.

In the case of a syntactic foam, hollow beads such as glass beads or hollow ceramic beads (microbeads) or microballoons are incorporated in a polymer matrix. As a result, in a syntactic foam, the voids are separated from one another and the substances (gas, air) present in the voids are divided from the surrounding matrix by a membrane.

Compositions foamed with hollow microbeads are notable for a defined cell structure with a homogeneous size distribution of the foam cells. With hollow microbeads, closed-cell foams without voids are obtained, the features of which include better sealing action against dust and liquid media compared to open-cell variants. Furthermore, chemically or physically foamed materials have a greater propensity to irreversible collapse under pressure and temperature, and frequently show lower cohesive strength.

Particularly advantageous properties can be achieved when the microbeads used for foaming are expandable microbeads (also referred to as "microballoons"). By virtue of their flexible, thermoplastic polymer shell, foams of this kind have higher adaptation capacity than those filled with non-expandable, non-polymeric hollow microbeads (for example hollow glass beads). They have better suitability for compensation for manufacturing tolerances, as is the rule, for example, in the case of injection-molded parts, and can also better compensate for thermal stresses because of their foam character.

Furthermore, it is possible to further influence the mechanical properties of the foam via the selection of the thermoplastic resin of the polymer shell. For example, even when the foam has a lower density than the matrix, it is possible to produce foams having higher cohesive strength than with the polymer matrix alone. For instance, typical foam properties such as adaptation capacity to rough substrates can be combined with a high cohesive strength for self-adhesive foams.

Among the devices in the consumer electronics industry are electronic, optical and precision devices, in the context of this application especially those devices as classified in Class 9 of the International Classification of Goods and Services for the Registration of Marks (Nice classification); 10th edition (NCL(10-2013)), to the extent that these are electronic, optical or precision devices, and also clocks and time-measuring devices according to Class 14 (NCL(10-2013)), such as, in particular, scientific, marine, measurement, photographic, film, optical, weighing, measuring, signalling, monitoring, rescuing, and instruction apparatus and instruments;

apparatus and instruments for conducting, switching, converting, storing, regulating and monitoring electricity;

image recording, processing, transmission, and reproduction devices, such as televisions and the like;

acoustic recording, processing, transmission, and reproduction devices, such as broadcasting devices and the like;

computers, calculating instruments and data-processing devices, mathematical devices and instruments, computer accessories, office instruments—for example, printers, faxes, copiers, typewriters—, data-storage devices;

telecommunications devices and multifunction devices with a telecommunications function, such as telephones and answering machines;

chemical and physical measuring devices, control devices, and instruments, such as battery chargers, multimeters, lamps, and tachometers;

nautical devices and instruments;

optical devices and instruments;

medical devices and instruments and those for sportspeople;

clocks and chronometers;

solar cell modules, such as electrochemical dye solar cells, organic solar cells, and thin-film cells;

fire-extinguishing equipment.

Technical development is going increasingly in the direction of devices which are ever smaller and lighter in design, allowing them to be carried at all times by their owner, and in fact usually being generally carried. This is accomplished increasingly nowadays by realization of low weights and/or suitable size of such devices. Such devices are also referred to as mobile or portable devices for the purposes of this specification. In this development trend, precision and optical devices are increasingly being provided (also) with electronic components, thereby raising the possibilities for minimization. On account of the carrying of the mobile devices, they are subject to increased loads—in particular, to mechanical loads—as for instance by impact on edges, by being dropped, by contact with other hard objects in a bag, or else simply by the permanent motion involved in being carried per se. Mobile devices, however, are also subject to a greater extent to loads due to moisture exposure, temperature influences, and the like, than those "immobile" devices which are usually installed in interiors and which move little or not at all.

The invention accordingly refers with particular preference to mobile devices, since the pressure-sensitive adhesive strip used in accordance with the invention has a particular benefit here on account of the unexpectedly good, namely further improved, properties (very high shock resistance). Listed below are a number of portable devices, without wishing the representatives specifically identified in this list to impose any unnecessary restriction with regard to the subject-matter of the invention.

cameras, digital cameras, photography accessories (such as lightmeters, flashguns, diaphragms, camera casings, lenses, etc.), film cameras, video cameras small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems, computer accessories and operating units for electronic devices, such as mice, drawing pads, graphics tablets, microphones, loudspeakers, games consoles, gamepads, remote controls, remote operating devices, touchpads monitors, displays, screens, touch-sensitive screens (sensor screens, touchscreen devices), projectors reading devices for electronic books ("E-books")

mini TVs, pocket TVs, devices for playing films, video players radios (including mini and pocket radios), WALKMAN® audio cassette tape players, Discmans, music players for e.g. CDs, DVDs, Blu-ray, cassettes, USB, MP3, headphones cordless telephones, cellphones, smartphones, two-way radios, hands-free telephones, devices for summoning people (pagers, bleepers)

mobile defibrillators, blood sugar meters, blood pressure monitors, step counters, pulse meters torches, laser pointers mobile detectors, optical magnifiers, binoculars, night vision devices GPS devices, navigation devices, portable interface devices for satellite communications data storage devices (USB sticks, external hard drives, memory cards)

wristwatches, digital watches, pocket watches, chain watches, stopwatches.

For these devices, a particular requirement is for adhesive tapes having high holding performance.

In addition, it is important that the holding performance of the adhesive tapes does not fail when the electronic device, for example a cellphone, is dropped and hits the ground. The adhesive strip must thus have very high shock resistance.

EP 2 832 780 A1 relates to a pressure-sensitive adhesive foam comprising a rubber elastomer, at least one hydrocarbon tackifier and a crosslinker selected from the group of the polyfunctional (meth)acrylate compounds.

JP 2010/070,655 A relates to a composition comprising a styrene-based thermoplastic elastomer (A), a tackifier (B) and thermally expandable foaming agent in microcapsule form.

DE 10 2008 056 980 A1 relates to a self-adhesive composition consisting of a mixture comprising:

a polymer blend composed of thermoplastic and/or nonthermoplastic elastomers having at least one vinylaromatic block copolymer comprising a proportion of greater than 30% by weight of 1,2-bonded diene in the elastomer block, at least one tackifying resin, expanded polymeric microbeads.

WO 2009/090119 A1 relates to a pressure-sensitive adhesive composition comprising expanded microballoons, wherein the bonding force of the adhesive composition comprising the expanded microballoons is reduced by not more than 30% compared to the bonding force of an adhesive composition of identical basis weight and formulation that has been defoamed by the destruction of the voids formed by the expanded microballoons WO 2003/011954 A1 relates to a foamed pressure-sensitive adhesive article, wherein the article comprises a) a polymer mixture comprising at least one styrenic block copolymer and at least one polyarylene oxide, and b) one or more foamable polymer microbeads.

DE 10 2015 206 076 A1 relates to a pressure-sensitive adhesive strip which can be detached again without residue or destruction through extensive stretching essentially in the plane of the bond, composed of one or more adhesive composition layers that all consist of a pressure-sensitive adhesive composition foamed with microballoons, and optionally of one or more intermediate carrier layers, wherein the pressure-sensitive adhesive strip consists exclusively of the adhesive composition layers mentioned and any intermediate carrier layers present, and one outer upper and one outer lower face of the pressure-sensitive adhesive strip are formed by said adhesive composition layer(s). The redetachable pressure-sensitive adhesive strip is notable for its marked shock resistance.

DE 10 2016 202 479, a patent application from the same applicant as this document that was still unpublished at the priority date of the present application, describes a four-layer adhesive tape in which a foamed inner layer is additionally strengthened by a PET stabilization film. By virtue of such a construction, it was possible to offer particularly shock-resistant adhesive tapes.

DE 10 2016 209 707, a patent application from the same applicant as this document that was likewise still unpublished at the priority date of the present application, describes a pressure-sensitive adhesive strip composed of three layers, comprising an inner layer F of a non-extensible film carrier, a layer SK1 composed of a self-adhesive composition arranged on one of the surfaces of the film carrier layer F and based on a foamed acrylate composition, and a layer SK2 composed of a self-adhesive composition arranged on the opposite surface of the film carrier layer F from the layer SK1 and based on a foamed acrylate composition. By virtue of such a construction, it was likewise possible to offer particularly shock-resistant adhesive tapes.

It is an object of the invention, with respect to the published prior art having an earlier priority date, to find a pressure-sensitive adhesive strip having improved shock resistance in the x,y plane and/or in the z plane (i.e. with respect to mechanical contact at right angles to the bond plane), and especially having improved shock resistance both in the x,y plane and in the z plane.

The problem is surprisingly solved in accordance with the invention by a pressure-sensitive adhesive strip of the generic type as set out in the main claim. The subject-matter of the dependent claims comprises advantageous embodiments of the pressure-sensitive adhesive strip.

Accordingly, the invention relates to a pressure-sensitive adhesive strip composed of at least three layers, especially exactly three layers, comprising an inner layer F composed of a non-extensible film carrier,
a layer SK1 composed of a self-adhesive composition arranged on one of the surfaces of the film carrier layer F and based on a vinylaromatic block copolymer composition foamed with microballoons,
a layer SK2 composed of a self-adhesive composition arranged on the opposite surface of the film carrier layer F from the layer SK1 and based on a vinylaromatic block copolymer composition foamed with microballoons,
where the mean diameter of each of the voids formed by the microballoons in the self-adhesive composition layers SK1 and SK2 is independently 20 to 60 µm.

The pressure-sensitive adhesive strips of the invention possess high shock resistance. Thus, they are characterized by a high impact resistance in z direction, but also in the x,y plane (i.e. transverse impact resistance). They also have very good values in the ball drop test (impact resistance). Moreover, they are notable for high push-out resistance (in the z plane). They can therefore especially be used for bonding of components, for example accumulators, and electronic devices, for example cellphones.

It has been found that, surprisingly, in self-adhesive composition layers based on vinylaromatic block copolymer compositions foamed with microballoons, it is possible to achieve improved shock resistances by selecting the mean diameters of the voids formed by the microballoons in the self-adhesive composition layers at 20 to 60 µm. Improved shock resistances are accordingly also possessed by the pressure-sensitive adhesive strips of the invention that comprise such self-adhesive composition layers.

The outer faces of the pressure-sensitive adhesive strip that are accessible to bonding are formed by the foamed vinylaromatic block copolymer compositions of the invention. This means that one outer upper face and one outer lower face of the pressure-sensitive adhesive strip are formed by the self-adhesive composition layers SK1 and SK2. In this way, the advantages identified in accordance with the invention, such as high shock resistance in the x,y plane and especially in the z plane, are implemented. Of central significance in respect of shock resistance are especially the voids of the diameter mentioned that are formed by the microballoons in the self-adhesive composition layers SK1 and SK2.

The inner layer F composed of a non-extensible film carrier is also referred to synonymously in the context of this document simply as film carrier, film layer or film carrier layer.

The layers SK1 and SK2 of self-adhesive composition, in the context of this document, are also referred to as self-adhesive composition layers SK1 and SK2, simply as layers SK1 and SK2, or else as outer layers, adhesive composition layers, self-adhesive composition layers or pressure-sensitive adhesive composition layers SK1 and SK2. The term "outer" relates here to the preferably three-layer construction of the pressure-sensitive adhesive strip, composed of the film carrier and layers SK1 and SK2, regardless of any liner present on the outer faces of the self-adhesive composition layers (see further down).

In the pressure-sensitive adhesive strip of the invention, the layers SK1 and SK2 composed of a self-adhesive composition are arranged on one of the surfaces of the film carrier layer F or on the opposite surface of the film carrier layer F from the layer SK1. The term "arrangement" of the layers SK1 and SK2 on the surfaces of the film carrier layer in the present application can mean an arrangement in which the layers SK1 and/or SK2, preferably both layers SK1 and SK2, are in direct contact with the surfaces of the film carrier layer, i.e. are arranged directly on the surface. Alternatively, this can also mean an arrangement in which there is at least one further layer between the layer SK1 and one surface of the film carrier layer F and/or between the layer SK2 and the opposite surface of the film carrier layer F from the layer SK1. Preferably, in the pressure-sensitive adhesive strip of the invention, both layers SK1 and SK2 are in direct contact with one of the surfaces of the film carrier layer F, or with the opposite surface of the film carrier layer F from the layer SK1.

A particularly preferred embodiment of the invention concerns a pressure-sensitive adhesive strip of symmetric construction in relation to the composition of the layers, in that the foamed self-adhesive vinylaromatic block copolymer compositions of the two outer layers SK1 and SK2 are chemically identical, and advantageously also, if additives are added thereto, these are identical and used in an identical amount.

Also achievable in accordance with the invention is a pressure-sensitive adhesive strip which is of structurally symmetric construction in z direction, in that the outer self-adhesive composition layers SK1 and SK2 are of equal thickness and/or have the same density but —as respectively foamed self-adhesive vinylaromatic block copolymer composition layers —are chemically different.

In a very advantageous procedure, the pressure-sensitive adhesive strip is of entirely symmetric construction, i.e. both with regard to the chemical composition of the two foamed self-adhesive vinylaromatic block copolymer composition layers SK1 and SK2 (including any additizations present therein) and with regard to the structural composition thereof, in that both surfaces of the non-extensible film carrier F have been identically pretreated and the two outer self-adhesive composition layers SK1 and SK2 have the same thickness and density. "Entirely symmetric" relates especially to the z direction ("thickness", direction perpendicular to the plane of the pressure-sensitive adhesive strip) of the pressure-sensitive adhesive strip, but may of course additionally also relate to the geometry in the surface plane (x and y directions, i.e. length and width, of the pressure-sensitive adhesive strip).

The remarks which follow relate explicitly and without exception also to the entirely symmetric embodiment of the invention.

The self-adhesive vinylaromatic block copolymer compositions of layers SK1 and SK2 are each a pressure-sensitive adhesive (PSA) composition. The terms "self-adhesive" and "pressure-sensitively adhesive" are used synonymously in this respect within the scope of this document.

Pressure-sensitive adhesive compositions are especially those polymeric compositions which—if appropriate by suitable additization with further components, for example tackifying resins—are permanently tacky and adhesive at the use temperature (unless defined otherwise, at room temperature) and adhere on contact to a multitude of surfaces, and especially adhere immediately (called "tack" [tackiness or touch-tackiness]). They are capable, even at the use temperature, without activation by solvent or by heat— but typically via the influence of a greater or lesser pressure—of sufficiently wetting a substrate to be bonded that sufficient interactions for adhesion can form between the composition and the substrate. Influencing parameters that are essential in this respect include the pressure and the contact time. The exceptional properties of the pressure-sensitive adhesive compositions derive, inter alia, especially from their viscoelastic properties. For example, it is possible to produce weakly or strongly adhering adhesive compositions; and also those that can be bonded just once and permanently, such that the bond cannot be parted without destruction of the adhesive and/or the substrates, or those that can readily be parted again and, if appropriate, bonded repeatedly.

Pressure-sensitive adhesive compositions can in principle be produced on the basis of polymers of different chemical nature. The pressure-sensitive adhesive properties are affected by factors including the nature and the ratios of the monomers used in the polymerization of the polymers underlying the pressure-sensitive adhesive composition, the mean molar mass and molar mass distribution thereof, and the nature and amount of the additives to the pressure-sensitive adhesive composition, such as tackifying resins, plasticizers and the like.

To achieve the viscoelastic properties, the monomers on which the polymers underlying the pressure-sensitive adhesive composition are based, and any further components present in the pressure-sensitive adhesive composition, are especially chosen such that the pressure-sensitive adhesive composition has a glass transition temperature (to DIN 53765) below the use temperature (i.e. typically below room temperature).

A pressure-sensitive adhesive composition has permanent pressure-sensitive adhesion at room temperature, i.e. has a sufficiently low viscosity and high touch-tackiness, such that it wets the surface of the respective adhesive substrate even at low contact pressure. The bondability of the adhesive composition is based on its adhesive properties, and the redetachability is based on its cohesive properties.

If reference is made in the remarks which follow relating to preferred embodiments of the invention to a "self-adhesive composition layer" or "self-adhesive composition layers" or to a "vinylaromatic block copolymer composition" or "vinylaromatic block copolymer compositions", this may relate to layer SK1, to layer SK2 or else to both layers.

Self-Adhesive Composition Layers Usable in Accordance With the Invention

The layers SK1 and SK2 are each based on a vinylaromatic block copolymer composition foamed with microballoons.

The vinylaromatic block copolymer used is preferably at least one synthetic rubber in the form of a block copolymer having an A-B, A-B-A, $(A-B)_n$, $(A-B)_nX$ or $(A-B-A)_nX$ structure, in which
  the A blocks are independently a polymer formed by polymerization of at least one vinylaromatic,
  the B blocks are independently a polymer formed by polymerization of conjugated dienes having 4 to 18 carbon atoms, or a partly hydrogenated derivative of such a polymer,
  X is the radical of a coupling reagent or initiator and
  n is an integer $\geq 2$.

More preferably, all synthetic rubbers in the self-adhesive composition layer of the invention are block copolymers having an A-B, A-B-A, $(A-B)_n$, $(A-B)_nX$ or $(A-B-A)_nX$ construction as set out above. The self-adhesive composition layer of the invention may thus also comprise mixtures of various block copolymers having a construction as described above.

Suitable block copolymers (vinylaromatic block copolymers) thus comprise one or more rubber-like blocks B (soft blocks) and one or more glass-like blocks A (hard blocks). More preferably, at least one synthetic rubber in the self-adhesive composition layer of the invention is a block copolymer having an A-B, A-B-A, $(A-B)_2X$, $(A-B)_3X$ or $(A-B)_4X$ construction, where the above meanings are applicable to A, B and X. Most preferably, all synthetic rubbers in the self-adhesive composition layer of the invention are block copolymers having an A-B, A-B-A, $(A-B)_2X$, $(A-B)_3X$ or $(A-B)_4X$ construction, where the above meanings are applicable to A, B and X. More particularly, the synthetic rubber in the self-adhesive composition layer of the invention is a mixture of block copolymers having an A-B, A-B-A, $(A-B)_2X$, $(A-B)_3X$ or $(A-B)_4X$ structure, preferably comprising at least triblock copolymers A-B-A and/or $(A-B)_2X$ and at least one diblock copolymer A-B.

Also advantageous is a mixture of diblock and triblock copolymers and $(A-B)_n$ or $(A-B)_nX$ block copolymers with n not less than 3.

Also advantageous is a mixture of diblock and multiblock copolymers and $(A-B)_n$ or $(A-B)_nX$ block copolymers with n not less than 3.

Vinylaromatic block copolymers utilized may thus, for example, be diblock copolymers A-B in combination with others among the block copolymers mentioned. It is possible to use the proportion of diblock copolymers to adjust the adaptation characteristics of the self-adhesive compositions and the bond strength thereof. Vinylaromatic block copolymer used in accordance with the invention preferably has a diblock copolymer content of 0% to 70% by weight and more preferably of 15% to 50% by weight. A higher proportion of diblock copolymer in the vinylaromatic block copolymer leads to a distinct reduction in cohesion of the adhesive composition.

The self-adhesive compositions employed are preferably those based on block copolymers comprising polymer blocks (i) predominantly formed from vinylaromatics (A blocks), preferably styrene, and simultaneously (ii) those predominantly formed by polymerization of 1,3-dienes (B blocks), for example butadiene and isoprene or a copolymer of the two.

More preferably, self-adhesive compositions of the invention are based on styrene block copolymers; for example, the block copolymers of the self-adhesive compositions have polystyrene end blocks.

The block copolymers that result from the A and B blocks may contain identical or different B blocks. The block copolymers may have linear A-B-A structures. It is likewise possible to use block copolymers in radial form and star-shaped and linear multiblock copolymers. Further components present may be A-B diblock copolymers. All the aforementioned polymers can be utilized alone or in a mixture with one another.

In a vinylaromatic block copolymer used in accordance with the invention, such as a styrene block copolymer in particular, the proportion of polyvinylaromatics, such as polystyrene in particular, is preferably at least 12% by weight, more preferably at least 18% by weight and especially preferably at least 25% by weight, and likewise preferably at most 45% by weight and more preferably at most 35% by weight.

Rather than the preferred polystyrene blocks, vinylaromatics used may also be polymer blocks based on other aromatic-containing homo- and copolymers (preferably $C_8$ to $C_{12}$ aromatics) having glass transition temperatures of greater than 75° C., for example α-methylstyrene-containing aromatic blocks. In addition, it is also possible for identical or different A blocks to be present.

Preferably, the vinylaromatics for formation of the A block include styrene, α-methylstyrene and/or other styrene derivatives. The A block may thus be in the form of a homo- or copolymer. More preferably, the A block is a polystyrene.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

More preferably, the conjugated dienes as monomers for the soft block B are selected from butadiene and isoprene. For example, the soft block B is a polyisoprene, a polybutadiene or a partly hydrogenated derivative of one of these two polymers, such as polybutylene-butadiene in particular, or a polymer formed from a mixture of butadiene and isoprene. Most preferably, the B block is a polybutadiene.

A blocks are also referred to as "hard blocks" in the context of this invention. B blocks are correspondingly also called "soft blocks" or "elastomer blocks". This is reflected by the inventive selection of the blocks in accordance with their glass transition temperatures (for A blocks at least 25° C., especially at least 50° C., and for B blocks at most 25° C., especially at most −25° C.).

The proportion of the vinylaromatic block copolymers, such as styrene block copolymers in particular, preferably based on the overall self-adhesive composition layer, totals at least 20% by weight, preferably at least 30% by weight, further preferably at least 35% by weight. Too low a proportion of vinylaromatic block copolymers results in relatively low cohesion of the pressure-sensitive adhesive composition.

The maximum proportion of the vinylaromatic block copolymers, such as styrene block copolymers in particular, based on the overall self-adhesive composition, totals at most 75% by weight, preferably at most 65% by weight, further preferably at most 55% by weight. Too high a proportion of vinylaromatic block copolymers in turn results in barely any pressure-sensitive adhesion in the pressure-sensitive adhesive composition.

Accordingly, the proportion of the vinylaromatic block copolymers, such as styrene block copolymers in particular, based on the overall self-adhesive composition, preferably totals at least 20% by weight, more preferably at least 30% by weight, further preferably at least 35% by weight, and simultaneously at most 75% by weight, more preferably at most 65% by weight, most preferably at most 55% by weight.

The pressure-sensitive adhesion of the self-adhesive compositions can be achieved by addition of tackifying resins that are miscible with the elastomer phase. The self-adhesive compositions generally include, as well as the at least one vinylaromatic block copolymer, at least one tackifying resin in order to increase the adhesion in the desired manner. The tackifying resin should be compatible with the elastomer block of the block copolymers.

A "tackifying resin", in accordance with the general understanding of the person skilled in the art, is understood to mean an oligomeric or polymeric resin that increases the adhesion (tack, intrinsic tackiness) of the pressure-sensitive adhesive composition compared to the pressure-sensitive adhesive composition that does not contain any tackifying resin but is otherwise identical.

If tackifying resin is present in the self-adhesive compositions, correspondingly, a resin having a DACP (diacetone alcohol cloud point) of greater than 0° C., preferably greater than 10° C., and a softening temperature (ring & ball) of not less than 70° C., preferably not less than 100° C., is chosen to an extent of at least 75% by weight (based on the total resin content). More preferably, the tackifying resin mentioned simultaneously has a DACP value of not more than 45° C. if no isoprene blocks are present in the elastomer phase, or of not more than 60° C. if isoprene blocks are present in the elastomer phase. More preferably, the softening temperature of the tackifying resin mentioned is not more than 150° C.

More preferably, the tackifying resins comprise at least 75% by weight (based on the total resin content) of hydrocarbon resins or terpene resins or a mixture of the same.

It has been found that tackifiers advantageously usable for the pressure-sensitive adhesive composition(s) are especially nonpolar hydrocarbon resins, for example hydrogenated and non-hydrogenated polymers of dicyclopentadiene, non-hydrogenated, partly, selectively or fully hydrogenated hydrocarbon resins based on $C_5$, $C_5/C_9$ or $C_9$ monomer streams, and polyterpene resins based on α-pinene and/or β-pinene and/or δ-limonene. The aforementioned tackifying resins can be used either alone or in a mixture. It is possible to use either room temperature solid resins or liquid resins. Tackifying resins, in hydrogenated or non-hydrogenated form, which also contain oxygen, can optionally and preferably be used in the adhesive composition up to a maximum proportion of 25%, based on the total mass of the resins, for example rosins and/or rosin esters and/or terpene-phenol resins.

The proportion of the optionally usable resins or plasticizers that are liquid at room temperature, in a preferred variant, is up to 15% by weight, preferably up to 10% by weight, based on the overall self-adhesive composition.

In a preferred embodiment, 20% to 60% by weight of at least one tackifying resin, based on the total weight of the self-adhesive composition layer, preferably 30% to 50% by weight of at least one tackifying resin, based on the total weight of the self-adhesive composition layer, is present in the self-adhesive composition layers.

Further additives that can typically be utilized are:
  plasticizers, for example plasticizer oils, or low molecular weight liquid polymers, for example low molecular weight polybutenes,
  preferably with a proportion of 0.2% to 5% by weight, based on the total weight of the self-adhesive composition,
  primary antioxidants, for example sterically hindered phenols,
  preferably with a proportion of 0.2% to 1% by weight, based on the total weight of the self-adhesive composition,
  secondary antioxidants, for example phosphites, thioesters or thioethers, preferably with a proportion of 0.2% to 1% by weight, based on the total weight of the self-adhesive composition,
  process stabilizers, for example carbon radical scavengers,
  preferably with a proportion of 0.2% to 1% by weight, based on the total weight of the self-adhesive composition,
  light stabilizers, for example UV absorbers or sterically hindered amines, preferably with a proportion of 0.2% to 1% by weight, based on the total weight of the self-adhesive composition,
  processing auxiliaries,
  preferably with a proportion of 0.2% to 1% by weight, based on the total weight of the self-adhesive composition,
  end block reinforcer resins,
  preferably with a proportion of 0.2% to 10% by weight, based on the total weight of the self-adhesive composition, and optionally further polymers that are preferably elastomeric in nature;

correspondingly utilizable elastomers include those based on pure hydrocarbons, for example unsaturated polydienes such as natural or synthetically produced polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogenated, acrylated, allyl or vinyl ether-containing polyolefins, preferably with a proportion of 0.2% to 10% by weight, based on the total weight of the self-adhesive composition.

The nature and amount of the blend components can be selected as required.

It is also in accordance with the invention when the adhesive composition does not have some of and preferably any of the admixtures mentioned.

In one embodiment of the present invention, the self-adhesive composition also comprises further additives; non-limiting examples include crystalline or amorphous oxides, hydroxides, carbonates, nitrides, halides, carbides or mixed oxide/hydroxide/halide compounds of aluminum, of silicon, of zirconium, of titanium, of tin, of zinc, of iron or of the alkali metals/alkaline earth metals. These are essentially aluminas, for example aluminum oxides, boehmite, bayerite, gibbsite, diaspore and the like. Sheet silicates are very particularly suitable, for example bentonite, montmorillonite, hydrotalcite, hectorite, kaolinite, boehmite, mica, vermiculite or mixtures thereof. But it is also possible to use carbon blacks or further polymorphs of carbon, for instance carbon nanotubes.

The adhesive compositions may also be colored with dyes or pigments. The adhesive compositions may be white, black or colored.

The plasticizers metered in may, for example, be mineral oils, (meth)acrylate oligomers, phthalates, cyclohexanedicarboxylic esters, water-soluble plasticizers, plasticizing resins, phosphates or polyphosphates.

The addition of silicas, advantageously of precipitated silica surface-modified with dimethyldichlorosilane, can be utilized in order to adjust the thermal shear strength of the self-adhesive composition.

In a preferred embodiment of the invention, the adhesive composition consists solely of vinylaromatic block copolymers, tackifying resins, microballoons and optionally the abovementioned additives.

Further preferably, the adhesive composition consists of the following composition:

| | |
|---|---|
| vinylaromatic block copolymers | 20% to 75% by weight |
| tackifying resins | 24.6% to 60% by weight |
| microballoons | 0.2% to 10% by weight |
| additives | 0.2% to 10% by weight |

Further preferably, the adhesive composition consists of the following composition:

| | |
|---|---|
| vinylaromatic block copolymers | 35% to 65% by weight |
| tackifying resins | 34.6% to 45% by weight |
| microballoons | 0.2% to 10% by weight |
| additives | 0.2% to 10% by weight |

Further preferably, the adhesive composition consists of the following composition:

| | |
|---|---|
| vinylaromatic block copolymers | 30% to 75% by weight |
| tackifying resins | 24.8% to 60% by weight |
| microballoons | 0.2% to 10% by weight |

The self-adhesive compositions of the invention have been foamed. Preferably, the foaming is effected by the introduction and subsequent expansion of (unexpanded) microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Outside action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of unexpanded microballoon types is commercially available, which differ essentially in terms of their size and the starting temperatures that they require for expansion (75 to 220° C.). One example of commercially available unexpanded microballoons is the Expancel® DU products (DU=dry unexpanded) from Akzo Nobel. In the product designation Expancel xxx DU yy (dry unexpanded), "xxx" represents the composition of the microballoon mixture, and "yy" the size of the microballoons in the expanded state.

Unexpanded microballoon products are also available in the form of an aqueous dispersion having a solids/microballoon content of about 40% to 45% by weight, and additionally also in the form of polymer-bound microballoons (masterbatches), for example in ethylene-vinyl acetate with a microballoon concentration of about 65% by weight. Both the microballoon dispersions and the masterbatches, like the DU products, are suitable for production of a foamed self-adhesive composition of the invention.

A foamed self-adhesive composition of the invention can also be produced with what are called pre-expanded microballoons. In the case of this group, the expansion already takes place prior to mixing into the polymer matrix. Pre-expanded microballoons are commercially available, for example, under the Dualite® name or with the product designation Expancel xxx DE yy (dry expanded) from Akzo Nobel. "xxx" represents the composition of the microballoon mixture; "yy" represents the size of the microballoons in the expanded state.

In the processing of already expanded microballoon types, it is possible that the microballoons, because of their low density in the polymer matrix into which they are to be incorporated, will have a tendency to float, i.e. to rise "upward" in the polymer matrix during the processing operation. This leads to inhomogeneous distribution of the microballoons in the layer. In the upper region of the layer (z direction), more microballoons are to be found than in the lower region of the layer, such that a density gradient across the layer thickness is established.

In order to largely or very substantially prevent such a density gradient, preference is given in accordance with the invention to incorporating only a low level of, if any, pre-expanded microballoons into the polymer matrix of layer SK1 or of layer SK2 or preferably of both layers SK1 and SK2. Only after the incorporation into the layer are the microballoons expanded. In this way, a more homogeneous distribution of the microballoons in the polymer matrix is obtained.

Preferably, the microballoons are chosen such that the ratio of the density of the polymer matrix to the density of the (non-pre-expanded or only slightly pre-expanded) microballoons to be incorporated into the polymer matrix is between 1 and 1:6. Expansion then follows immediately after or occurs directly in the course of incorporation. In the case of solvent-containing compositions, the microballoons are preferably expanded only after incorporation, coating, drying (solvent evaporation). Preference is therefore given in accordance with the invention to using DU products.

According to the invention, the mean diameter of the voids formed by the microballoons in the foamed self-adhesive composition layers SK1 and SK2 is independently 20 to 60 μm, preferably 20 to 50 μm, and more preferably 20 to 25 μm, for example 20 μm, or 35 to 45 μm, for example 40 μm. Within these ranges, particularly good shock resistances can be achieved.

Since it is the diameters of the voids formed by the microballoons in the foamed self-adhesive composition layers that are being measured here, the diameters are those diameters of the voids formed by the expanded microballoons. The mean diameter here is the arithmetic mean of the diameters of the voids formed by the microballoons in the respective self-adhesive composition layer SK1 or SK2.

The mean diameter of the voids formed by the microballoons in a self-adhesive composition layer is determined using cryofracture edges of the pressure-sensitive adhesive strip in a scanning electron microscope (SEM) with 500-fold magnification. The diameter of the microballoons in the self-adhesive composition layer to be examined that are visible in scanning electron micrographs of 5 different cryofracture edges of the pressure-sensitive adhesive strip is determined in each case by graphical means, and the arithmetic mean of all the diameters ascertained constitutes the mean diameter of the voids formed by the microballoons in the self-adhesive composition layer in the context of the present application. The diameters of the microballoons visible in the micrographs are determined by graphical means in such a way that the maximum extent in any (two-dimensional) direction is inferred from the scanning electron micrographs for each individual microballoon in the self-adhesive composition layer to be examined and regarded as the diameter thereof.

If foaming is effected by means of microballoons, the microballoons can then be supplied to the formulation as a masterbatch, paste or unblended or blended powder. In addition, they may be suspended in solvents.

The proportion of the microballoons in the self-adhesive composition layer, in a preferred embodiment of the invention, is between greater than 0% by weight and 10% by weight, preferably between 0.25% by weight and 5% by weight, more preferably between 0.5% and 4% by weight, even more preferably between 1% by weight and 3.5% by weight, especially between 1.5% and 2.5% by weight, based in each case on the overall composition of the self-adhesive composition layer. Within these ranges, it is possible to achieve particularly good shock resistances, especially particularly good impact resistances in the z direction and in the x,y plane, and also very high ball drop values.

A polymer composition of the invention, comprising expandable hollow microbeads, may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

Also suitable for the self-adhesive composition of the invention—selected independently of other additives—are solid polymer beads, hollow glass beads, solid glass beads, hollow ceramic beads, solid ceramic beads and/or solid carbon beads ("carbon microballoons").

The absolute density of a foamed self-adhesive composition layer of the invention is preferably 400 to 990 kg/m$^3$, more preferably 450 to 970 kg/m$^3$, even more preferably 500 to 900 kg/m$^3$, even more preferably 550 to 800 kg/m$^3$ and especially 600 to 750 kg/m$^3$, for example 600 to 700 kg/m$^3$. Within these ranges, it is possible to achieve particularly good shock resistances of the self-adhesive composition layers, i.e. especially high impact resistance in the z direction and in the x,y plane, and also high ball drop values. The same also applies to the pressure-sensitive adhesive strips of the invention, comprising self-adhesive composition layers having such absolute densities.

The relative density describes the ratio of the density of the foamed self-adhesive composition of the invention to the density of the unfoamed self-adhesive composition of the invention having an identical formulation. The relative density of a pressure-sensitive adhesive composition of the invention is preferably 0.35 to 0.99, more preferably 0.45 to 0.97, especially 0.50 to 0.90.

Preferably, the foamed self-adhesive composition layers SK1 and/or SK2 have a thickness between 20 and 200 μm, for example of 50 μm-70 μm.

Film Carrier

The inner layer F of the pressure-sensitive adhesive strip of the invention consists of a non-extensible film carrier. According to the invention, a "non-extensible film carrier" means a film carrier having, preferably both in longitudinal direction and in transverse direction, an elongation at break of less than 300%. The film carrier preferably also has, preferably independently both in longitudinal direction and in transverse direction, an elongation at break of less than 200%, more preferably less than 150%, even more preferably of less than 100%, and especially of less than 70%, for example of less than 50%. The values reported are based in each case on the test method R1 specified later on. The use of the non-extensible film carrier facilitates the processibility of the resulting pressure-sensitive adhesive strip; more particularly, the die-cutting processes can be facilitated. Moreover, the use of a non-extensible film carrier, for example composed of polyethylene terephthalate (PET), in the pressure-sensitive adhesive strip of the invention, compared to the use of an extensible film carrier, i.e. a film carrier having an elongation at break of at least 300% (in relation to the test method R1 specified later on) both in longitudinal direction and in transverse direction, leads to improved shock resistance, especially to improved impact resistance in z direction and in the x,y plane and to improved ball drop values. The shock resistance of the pressure-sensitive adhesive strip of the invention cannot only be affected by the foamed vinylaromatic block copolymer compositions, but surprisingly also by the nature of the film carrier used and the thickness thereof.

Materials used for the film of the non-extensible film carrier F are preferably polyesters, especially polyethylene terephthalate (PET), polyamide (PA), polyimide (PI) or mono- or biaxially stretched polypropylene (PP). It is likewise possible also to use multilayer laminates or co-extrudates, especially composed of the aforementioned materials. Preferably, the non-extensible film carrier has a single layer.

In an advantageous procedure, one or both surfaces of the film layer F have been physically and/or chemically pretreated. Such a pretreatment can be effected, for example, by etching and/or corona treatment and/or plasma pretreatment and/or primer treatment, preferably by etching. If both surfaces of the film layer have been pretreated, the pretreatment of each surface may have been different or, more particularly, both surfaces may have been given the same pretreatment.

In order to achieve very good results for the roughening, it is advisable to use, as reagent for etching of the film, trichloroacetic acid ($Cl_3C$—COOH) or trichloroacetic acid in combination with inert pulverulent compounds, preferably silicon compounds, more preferably $[SiO_2]_x$. The point of the inert compounds is to be incorporated into the surface of the film, especially the PET film, in order in this way to enhance the roughness and surface energy.

Corona treatment is a chemical/thermal process for enhancing the surface tension/surface energy of polymeric substrates. Electrons are greatly accelerated in a high-voltage discharge between two electrodes, which leads to ionization of the air. If a plastics substrate is introduced into the path of these accelerated electrons, the accelerated electrons thus produced hit the substrate surface with 2-3 times the energy that would be needed to break the molecular bonds at the surface of most substrates. This leads to formation of gaseous reaction products and of highly reactive free radicals. These free radicals can react rapidly in the presence of oxygen and the reaction products and form various chemical functional groups at the substrate surface. Functional groups that result from these oxidation reactions make the greatest contribution to increasing the surface energy. Corona treatment can be effected with two-electrode systems, or else with one-electrode systems. During the corona pretreatment, (as well as the usual air) it is possible to use different process gases such as nitrogen that form a protective gas atmosphere or promote the corona pretreatment.

The plasma treatment—especially low-pressure plasma treatment—is a known process for surface pretreatment of adhesive compositions. The plasma leads to activation of the surface in the sense of a higher reactivity. This results in chemical changes to the surface, as a result of which, for example, the characteristics of the adhesive composition with respect to polar and nonpolar surfaces can be altered. This pretreatment essentially comprises surface phenomena.

Primers refer generally to coatings or basecoats which especially have an adhesion-promoting and/or passivating and/or corrosion-inhibiting effect. In the context of the present invention, it is the adhesion-promoting effect that is especially important. Adhesion-promoting primers, often also called adhesion promoters, are in many cases known in the form of commercial products or from the technical literature.

The thickness of the film carrier layer F, in a preferred embodiment, is between 5 and 125 µm, more preferably between 10 and 60 µm, even more preferably between 10 and 50 µm, even more preferably between 10 and 40 µm, even more preferably between 23 and 40 µm and especially between 30 and 40 µm; for example it is 36 µm. The thickness of the film can surprisingly also affect the shock resistance of the pressure-sensitive adhesive strip.

Preferably, the film consists of polyethylene terephthalate and has a thickness between 10 and 50 µm, especially between 30 and 40 µm, for example 36 µm. If such a film is used in a pressure-sensitive adhesive strip of the invention, it is possible to achieve very good shock resistances. This is especially true when the absolute density of the self-adhesive composition layers SK1 and/or SK2 is 600 to 750 kg/m$^3$, for example 600 to 700 kg/m$^3$. Pressure-sensitive adhesive compositions of this kind especially have particularly high impact resistance in z direction and in the x,y plane, and also very good ball drop values.

A suitable film is available under the Hostaphan ® RNK trade name. This film is highly transparent and biaxially oriented and consists of three co-extruded layers.

For production of the film, it may be appropriate to add additives and further components that improve the film-forming properties, reduce the tendency to formation of crystalline segments and/or selectively improve or else, if appropriate, worsen the mechanical properties.

In addition, the film carrier layers F may have outer layers, for example barrier layers, which prevent penetration of components from the adhesive composition into the film or vice versa. These outer layers may also have barrier properties in order thus to prevent through-diffusion of water vapor and/or oxygen.

The tensile strength of the film is preferably greater than 100 N/mm$^2$, even more preferably greater than 150 N/mm$^2$, even more preferably greater than 180 N/mm$^2$, and especially greater than 200 N/mm$^2$, for example greater than 250 N/mm$^2$, in longitudinal direction, and preferably greater than 100 N/mm$^2$, even more preferably greater than 150 N/mm$^2$, even more preferably greater than 180 N/mm$^2$, and especially greater than 200 N/mm$^2$, for example greater than 250 N/mm$^2$, in transverse direction (values reported each in relation to the test method R1 specified later on). The film is crucial in determining the tensile strength of the pressure-sensitive adhesive strip. Preferably, the pressure-sensitive adhesive strip has the same values for tensile strength as the film used.

The modulus of elasticity of the film is preferably more than 0.5 GPa, more preferably more than 1 GPa and especially more than 2.5 GPa, preferably both in longitudinal direction and in transverse direction.

Production and Configuration of the Pressure-Sensitive Adhesive Strip

The production and processing of the self-adhesive compositions can be effected either from solution or from the melt. The application of the self-adhesive compositions to the film carrier layer can be effected by direct coating or by lamination, especially hot lamination.

Advantageously, the outer, exposed faces of the outer adhesive composition layers SK1 and/or SK2 of the pressure-sensitive adhesive strip of the invention can be provided with materials having an anti-adhesive coating on both sides, such as a release paper or a release film, also called liner, specifically as a temporary carrier. A liner (release paper, release film) is not part of an adhesive tape, but merely an auxiliary for production and/or storage thereof and/or for further processing by die-cutting. Furthermore, a liner, by contrast with an adhesive tape carrier, is not firmly bonded to an adhesive layer.

Typical supply forms of the pressure-sensitive adhesive strips of the invention are adhesive tape rolls and adhesive strips as obtained, for example, in the form of die-cut parts.

Preferably, all layers are essentially in the shape of a cuboid. Further preferably, all layers are bonded to one another over the full area. This bond can be optimized by the pretreatment of the film surfaces.

The general expression "adhesive strip" (pressure-sensitive adhesive strip), or else synonymously "adhesive tape" (pressure-sensitive adhesive tape), in the context of this invention, encompasses all sheetlike structures such as films or film sections extending in two dimensions, tapes having extended length and limited width, tape sections and the like, and lastly also die-cut parts or labels.

The pressure-sensitive adhesive strip thus has a longitudinal extent (x direction) and a lateral extent (y direction). The pressure-sensitive adhesive strip also has a thickness (z direction) that runs perpendicular to the two extents, the lateral extent and longitudinal extent being several times greater than the thickness. The thickness is very substantially the same, preferably exactly the same, over the entire areal extent of the pressure-sensitive adhesive strip determined by its length and width.

The pressure-sensitive adhesive strip of the invention is especially in sheet form. A sheet is understood to mean an object, the length of which (extent in the x direction) is several times greater than its width (extent in the y direction), and the width over the entire length remains roughly and preferably exactly the same.

A die-cut part formed from the pressure-sensitive adhesive strip of the invention may especially have an outer die-cut edge and an inner opening, such that it takes the form of a frame. It is possible here for individual elements to have a width of less than 5 mm or of less than 2.5 mm or even of less than 1 mm. The inventive configuration of the pressure-sensitive adhesive strips leads to advantageous ease of use, especially even of such filigree die-cut parts. The film carrier envisaged in the pressure-sensitive adhesive strip of the invention leads to marked stiffness in the die-cut parts, such that the die-cutting process and the positioning of the die-cut parts are simplified.

The pressure-sensitive adhesive strip, especially in sheet form, can be produced in the form of a roll, i.e. in the form of a rolled-up Archimedean spiral.

The three-layer pressure-sensitive adhesive strip (i.e. neglecting any liners present) preferably has a thickness of 45 μm to 4000 μm, more preferably of 60 μm to 1000 μm, even more preferably of 70 μm to 500 μm and especially of 80 μm to 300 μm.

Properties of the Pressure-Sensitive Adhesive Strips of the Invention

The pressure-sensitive adhesive strips of the invention are notable for an excellent application profile, i.e. for very good application and adhesive properties.

More particularly, the object of the invention is achieved. For instance, it has been found that the pressure-sensitive adhesive strips of the invention have improved shock absorption capacity, and especially improved impact resistances.

In addition, the pressure-sensitive adhesive compositions of the invention have, for example, favorable indentation/hardness characteristics and very good compressibility.

Moreover, the pressure-sensitive adhesive compositions of the invention have good bond strength on rough substrates, good damping and/or sealing properties, and good adaptability to uneven substrates.

The shock absorption capacity of the pressure-sensitive adhesive compositions of the invention will be more particularly elucidated in the examples.

FIGURES

With reference to the figures described hereinafter, particularly advantageous embodiments of the invention will be elucidated in detail, without any intention to unnecessarily restrict the invention thereby.

FIG. 1 shows the schematic construction of a three-layer pressure-sensitive adhesive strip of the invention, composed of three layers 1, 2, 3 in cross section.

The strip comprises a non-extensible film carrier 1 (layer F) in the form of a PET film that has been etched on both sides. On the top side and on the bottom side of the PET film 1 there are two outer self-adhesive composition layers 2, 3 (layer SK1 and layer SK2). The self-adhesive composition layers 2, 3 (layers SK1 and SK2) are covered in turn by a liner 4, 5 on each side in the illustrative embodiment shown.

In addition, the invention encompasses a process for producing a pressure-sensitive adhesive strip of the invention (see FIG. 2), wherein the constituents for formation of an adhesive composition, such as polymers, resins or fillers and non-expanded microballoons, are mixed in a first mixing unit and heated to expansion temperature under elevated pressure, the microballoons are expanded on exit from the mixing unit, the adhesive composition mixture along with the expanded microballoons is formed to a layer in a roll applicator, the adhesive composition mixture along with the expanded microballoons is applied to a non-extensible carrier material in sheet form, the same adhesive composition mixture along with the expanded microballoons, or another adhesive composition mixture likewise usable in accordance with the invention along with the expanded microballoons, is applied on the other side of the carrier material in sheet form (not shown).

In addition, the invention encompasses a process for producing a pressure-sensitive adhesive strip of the invention (likewise see FIG. 2), wherein the constituents for formation of an adhesive composition, such as polymers, resins or fillers and non-expanded microballoons, are mixed in a first mixing unit and heated to expansion temperature, the microballoons are at least partly expanded during mixing, and are preferably expanded fully, the adhesive composition mixture along with the expanded microballoons is formed to a layer in a roll applicator, the adhesive composition mixture along with the expanded microballoons is applied to a non-extensible carrier material in sheet form, the same adhesive composition mixture along with the expanded microballoons, or another adhesive composition mixture likewise of the invention along with the expanded microballoons, is applied on the other side of the carrier material in sheet form (not shown).

The invention likewise encompasses a process for producing a pressure-sensitive adhesive strip of the invention (see FIG. 3), wherein the constituents for formation of an adhesive composition, such as polymers, resins or fillers, together with non-expanded microballoons, are mixed in a first mixing unit under elevated pressure and heated to a temperature below the expansion temperature of the microballoons, the mixed, especially homogeneous adhesive composition from the first mixing unit is transferred into a second unit and heated to expansion temperature under elevated pressure, the microballoons are expanded in the second unit or on exit from the second unit, the adhesive composition mixture along with the expanded microballoons is formed to a layer in a roll applicator, the adhesive composition mixture along with the expanded microballoons is applied to a non-extensible carrier material in sheet form, the same adhesive composition mixture along with the expanded microballoons, or another adhesive composition mixture likewise usable in accordance with the invention along with the expanded microballoons, is applied on the other side of the carrier material in sheet form (not shown).

The invention likewise relates to a process for producing a pressure-sensitive adhesive strip of the invention (see FIG. 4), wherein the constituents for formation of an adhesive composition, such as polymers, resins or fillers, are mixed in a first mixing unit, the mixed, especially homogeneous adhesive composition from the first mixing unit is transferred into a second mixing unit, into which the non-expanded microballoons are simultaneously introduced, the microballoons are expanded in the second mixing unit or on exit from the second mixing unit, the adhesive composition mixture along with the expanded microballoons is formed to a layer in a roll applicator, the adhesive composition mixture along with the expanded microballoons is applied to a non-extensible carrier material in sheet form, the same adhesive composition mixture along with the expanded microballoons, or another adhesive composition mixture likewise usable in accordance with the invention along with the expanded microballoons, is applied on the other side of the non-extensible carrier material in sheet form (not shown).

In a preferred embodiment of the invention, the adhesive composition is shaped in a film applicator and applied to the carrier material.

There is generally no need to degas compositions foamed with microballoons prior to coating in order to obtain a homogeneous, continuous coating. The expanding microballoons displace the air incorporated into the adhesive composition during compounding. In the case of high throughputs, it is nevertheless advisable to degas the compositions prior to coating in order to obtain a homogeneous feed of composition in the roll gap. The degassing is ideally effected directly upstream of the roll applicator at mixing temperature and with a pressure differential from ambient pressure of at least 200 mbar.

In addition, it is advantageous when the first mixing unit is a continuous unit, especially a planetary roll extruder, a twin-screw extruder or a pin extruder, the first mixing unit is a batchwise unit, especially a Z kneader or an internal mixer, the second mixing unit is a planetary roll extruder, a single-screw or twin-screw extruder or a pin extruder and/or the shaping unit in which the adhesive composition along with the expanded microballoons is shaped to give a carrier layer is a calender, a roll applicator or a gap formed by a roll and a fixed doctor.

With the processes of the invention, solvent-free processing of all previously known components of adhesive compositions and those described in the literature, especially self-adhesive components, is possible.

The above-described processes within the concept of the invention in variants of particularly excellent configuration are illustrated hereinafter, without any intention to impose unnecessary restriction through the choice of the figures depicted.

Figure 2:
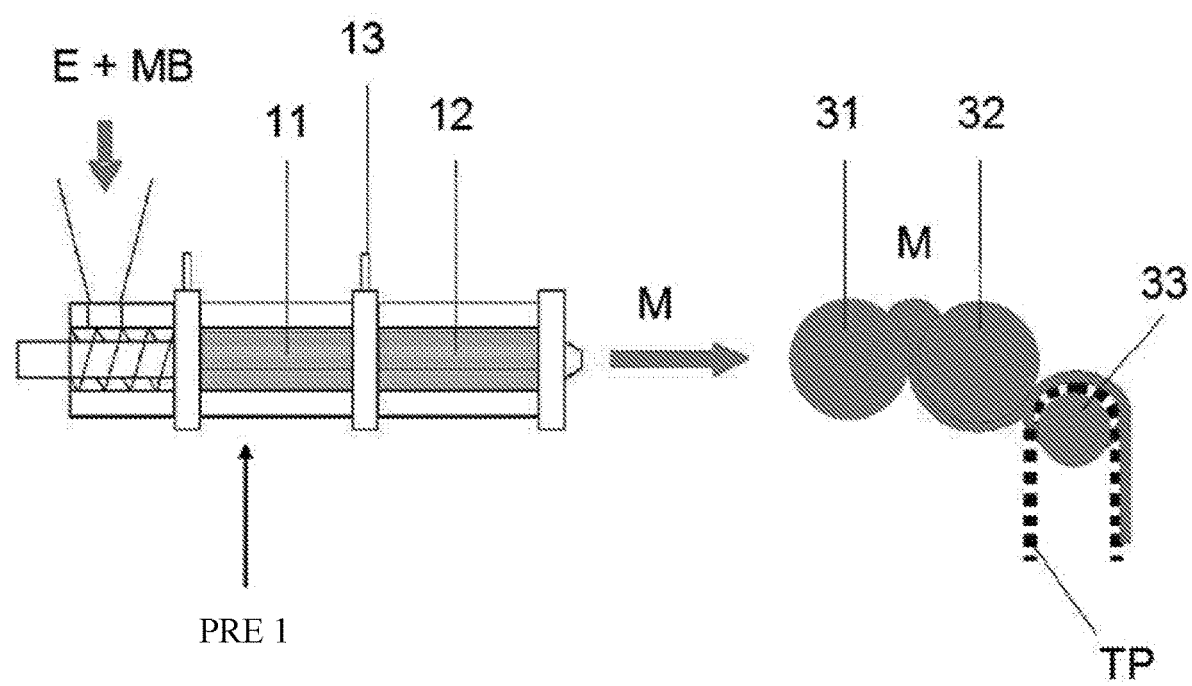
Figure 3:
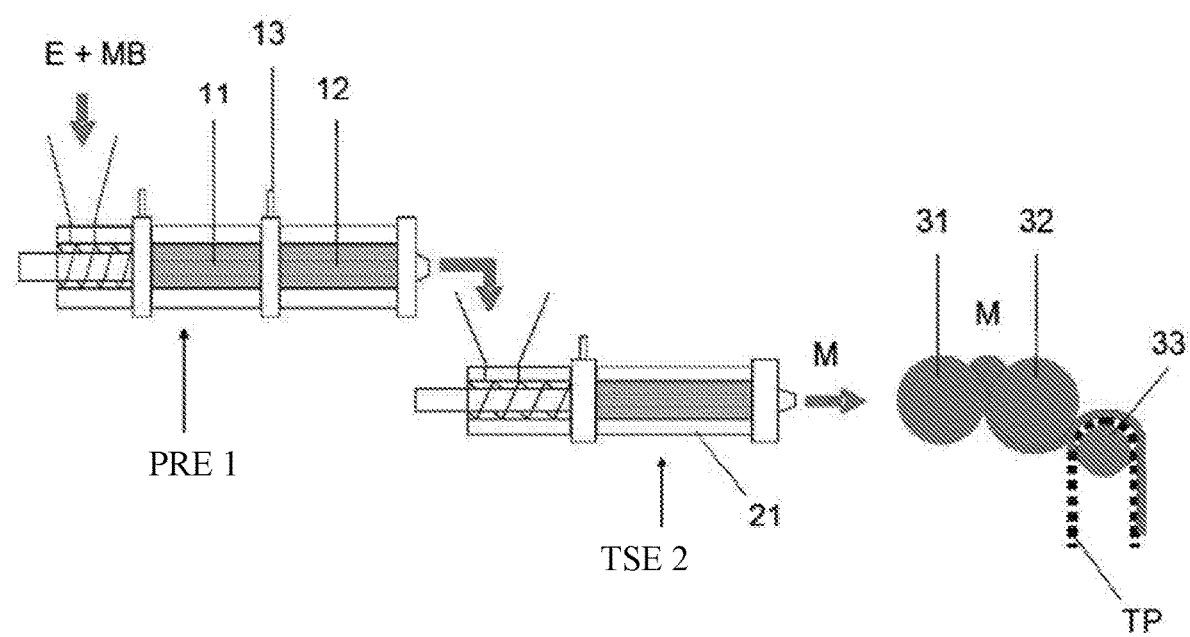
Figure 4:
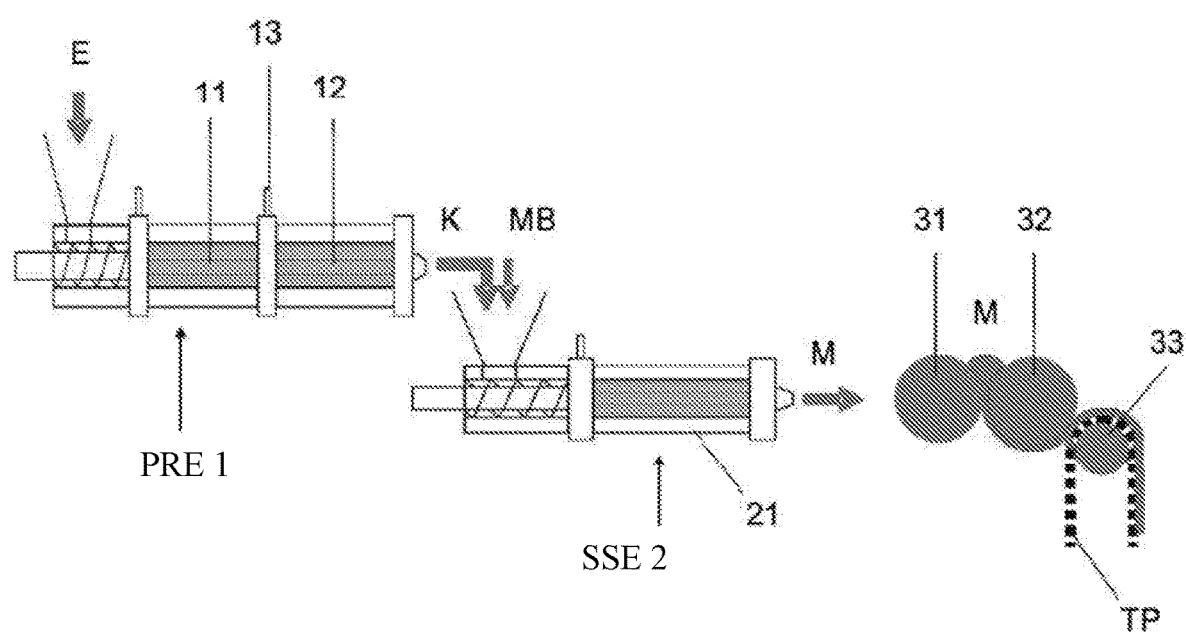

The figures show:

FIG. 2 the process with one mixing unit, wherein the microballoons are added directly in the first mixing unit, FIG. 3 the process with two mixing units, wherein the microballoons are added in the first mixing unit, and FIG. 4 the process having two mixing units, wherein the microballoons are added only in the second mixing unit.

FIG. 2 shows a particularly advantageously configured process for producing a foamed pressure-sensitive adhesive strip.

In a continuous mixing unit, for example a planetary roll extruder (PRE), the pressure-sensitive adhesive composition is produced.

For this purpose, the reactants E that are to form the adhesive composition are introduced into the planetary roll extruder PRE 1. At the same time, the unexpanded microballoons MB are incorporated homogeneously into the self-adhesive composition during the compounding process.

The temperatures required for homogeneous production of the self-adhesive composition and for expansion of the microballoons are adjusted with respect to one another such that the microballoons at least begin to expand during mixing and preferably foam completely in the self-adhesive composition M on exit from the PRE 1 as a result of the pressure drop on exit from the die, and in so doing break through the surface of the composition.

With a roll applicator 3 as shaping unit, this foam-like adhesive composition M is calendered and coated onto a non-extensible carrier material TP in sheet form; in some cases, further foaming can still take place in the roll gap. The roll applicator 3 consists of a doctor roll 31 and a coating roll 32. The carrier material TP is guided onto the latter via a pick-up roll 33, such that the carrier material TP takes up the adhesive composition K from the coating roll 32.

At the same time, the expanded microballoons MB are forced back into the polymer matrix of the adhesive composition K, and hence a smooth surface is generated. The drop in bonding force resulting from the microballoons can thus be distinctly reduced.

The same adhesive composition mixture along with the expanded microballoons, or another adhesive composition mixture likewise usable in accordance with the invention along with the expanded microballoons, is subsequently applied in an analogous manner on the other side of the carrier material in sheet form (not shown).

FIG. 3 shows a further particularly advantageously configured process for producing a foamed pressure-sensitive adhesive strip.

The planetary roll extruder PRE 1 has two successive mixing zones 11, 12 in which a central spindle rotates. In addition, there are six planetary spindles per heating zone. Further reactants are added to the injection ring 13, for example plasticizer or liquid resin.

An example of a suitable apparatus is the planetary roll extruder from Entex in Bochum.

Subsequently, the microballoons are incorporated homogeneously into the self-adhesive composition in a second mixing unit, for example a twin-screw extruder, heated above the expansion temperature and foamed.

For this purpose, the adhesive composition K formed from the reactants E is introduced here into the twin-screw extruder TSE 2; at the same time, the microballoons MB are introduced. The twin-screw extruder TSE has a total of four heating zones over its length 21.

An example of a suitable apparatus is a twin-screw extruder from Kiener.

During the expansion caused by the pressure drop at the nozzle exit of TSE 2, the foamed microballoons MB break through the surface of the composition.

With a roll applicator 3, this foam-like adhesive composition M is calendered and coated onto a non-extensible carrier material TP in sheet form; in some cases, further foaming can still take place in the roll gap. The roll applicator 3 consists of a doctor roll 31 and a coating roll 32. The carrier material TP is guided onto the latter via a pick-up roll 33, such that the carrier material TP takes up the adhesive composition K from the coating roll 32.

At the same time, the expanded microballoons MB are forced back into the polymer matrix of the adhesive composition K, and hence a smooth surface is generated. The drop in bonding force resulting from the microballoons can thus be distinctly reduced.

The same adhesive composition mixture along with the expanded microballoons, or another adhesive composition mixture likewise usable in accordance with the invention along with the expanded microballoons, is subsequently applied in an analogous manner on the other side of the carrier material in sheet form (not shown).

FIG. 4 shows a further particularly advantageously configured process for producing a foamed pressure-sensitive adhesive strip.

In a continuous mixing unit, for example a planetary roll extruder (PRE), the pressure-sensitive adhesive composition is produced.

Here, the reactants E that are to form the adhesive composition are introduced into the planetary roll extruder PRE 1. The planetary roll extruder PRE 1 has two successive mixing zones 11, 12 in which a central spindle rotates. In addition, there are 6 planetary spindles per heating zone.

Further reactants are added to the injection ring 13, for example plasticizer or liquid resin.

An example of a suitable apparatus is the planetary roll extruder from Entex in Bochum.

Subsequently, the microballoons are incorporated homogeneously under elevated pressure into the self-adhesive composition in a second mixing unit, for example a single-screw extruder, heated above the expansion temperature and foamed on exit.

For this purpose, the adhesive composition K formed from the reactants E is introduced here into the single-screw extruder SSE 2; at the same time, the microballoons MB are introduced. The single-screw extruder SSE has a total of four heating zones over its length 21.

An example of a suitable apparatus is a single-screw extruder from Kiener.

During the expansion caused by the pressure drop at the nozzle exit of SSE 2, the microballoons MB break through the surface of the composition.

With a roll applicator 3, this foam-like adhesive composition M is calendered and coated onto a non-extensible carrier material in sheet form; in some cases, further foaming can still take place in the roll gap. The roll applicator 3 consists of a doctor roll 31 and a coating roll 32. The carrier material TP is guided onto the latter via a pick-up roll 33, such that the carrier material TP takes up the adhesive composition K from the coating roll 32.

At the same time, the expanded microballoons MB are forced back into the polymer matrix of the adhesive composition K, and hence a smooth surface is generated. The drop in bonding force resulting from the microballoons can thus be distinctly reduced.

The same adhesive composition mixture along with the expanded microballoons, or another adhesive composition mixture likewise usable in accordance with the invention along with the expanded microballoons, is subsequently applied in an analogous manner on the other side of the carrier material in sheet form (not shown).

With falling gap pressure in the roll gap, there is a decrease in the bonding areas of the coated foamed self-adhesive compositions, since the microballoons are then forced back to a lesser degree, as can be inferred from FIG. 2. FIG. 2 shows the bonding areas as a function of the coating process or parameter. The gap pressure required is highly dependent on the composition system used; the higher the viscosity, the greater the gap pressure should be, depending on the layer thickness desired and the coating speed chosen. In practice, a gap pressure of greater than 4 N/mm has been found to be useful; with exceptionally high coating speeds greater than 50 m/min, with low applications of composition (basis weights less than 70 g/m$^2$) and high-viscosity compositions (50 000 Pa*s at 0.1 rad and 110° C.), gap pressures greater than 50 N/mm may even be required.

It has been found to be useful to adjust the temperature of the rolls to the expansion temperature of the microballoons. Ideally, the roll temperature of the first rolls is above the expansion temperature of the microballoons in order to enable further foaming of the microballoons without destroying them. The last roll should have a temperature equal to or below the expansion temperature in order that the microballoon shell can solidify and the smooth surface of the invention forms.

Many units for continuous production and processing of solvent-free polymer systems are known. Usually, screw machines such as single-screw and twin-screw extruders of different processing length and with different equipment are used. Alternatively, continuous kneaders of a wide variety of different designs, for example including combinations of kneaders and screw machines, or else planetary roller extruders, are used for this task.

Planetary roll extruders have been known for some time and were first used in the processing of thermoplastics, for example PVC, where they were used mainly for charging of the downstream units, for example calenders or roll systems. Their advantage of high surface renewal for material and heat exchange, with which the energy introduced via friction can be removed rapidly and effectively, and of short residence time and narrow residence time spectrum, has allowed their field of use to be broadened recently, inter alia, to compounding processes that require a mode of operation with exceptional temperature control.

Planetary roll extruders exist in various designs and sizes according to the manufacturer. According to the desired throughput, the diameters of the roll cylinders are typically between 70 mm and 400 mm.

Planetary roll extruders generally have a filling section and a compounding section.

The filling section consists of a conveying screw, into which all solid components are metered continuously. The conveying screw then transfers the material to the compounding section. The region of the filling section with the screw is preferably cooled in order to avoid caking of material on the screw. But there are also embodiments without a screw portion, in which the material is applied directly between central and planetary spindles. However, this is of no significance for the efficacy of the process of the invention.

The compounding section consists of a driven central spindle and several planetary spindles that rotate around the central spindle within one or more roll cylinders having internal helical gearing. The speed of the central spindle and hence the peripheral velocity of the planetary spindles can be varied and is thus an important parameter for control of the compounding process.

The materials are circulated between the central and planetary spindles, i.e. between planetary spindles and the helical gearing of the roll section, such that the materials are dispersed under the influence of shear energy and external temperature control to give a homogeneous compound.

The number of planetary spindles that rotate in each roll cylinder can be varied and hence adapted to the demands of the process. The number of spindles affects the free volume within the planetary roll extruder and the residence time of the material in the process, and additionally determines the size of the area for heat and material exchange. The number of planetary spindles affects the compounding outcome via the shear energy introduced. Given a constant roll cylinder diameter, it is possible with a greater number of spindles to achieve better homogenization and dispersion performance, or a greater product throughput.

The maximum number of planetary spindles that can be installed between the central spindle and roll cylinder is dependent on the diameter of the roll cylinder and on the diameter of the planetary spindles used. In the case of use of greater roll diameters as necessary for achievement of throughputs on the production scale, or smaller diameters for the planetary spindles, the roll cylinders can be equipped with a greater number of planetary spindles. Typically, up to seven planetary spindles are used in the case of a roll diameter of D=70 mm, while ten planetary spindles, for example, can be used in the case of a roll diameter of D=200 mm, and 24, for example, in the case of a roll diameter of D=400 mm.

It is proposed in accordance with the invention that the coating of the foamed adhesive compositions be conducted in a solvent-free manner with a multiroll applicator system. These may be applicator systems consisting of at least two rolls with at least one roll gap up to five rolls with three roll gaps.

Also conceivable are coating systems such as calenders (I,F,L calenders), such that the foamed adhesive composition is shaped to the desired thickness as it passes through one or more roll gaps.

It has been found to be particularly advantageous to choose the temperature regime for the individual rolls such that controlled further foaming can take place if appropriate, in such a way that transferring rolls can have a temperature above or equal to the foaming temperature of the microballoon type chosen, whereas receiving rolls should have a temperature below or equal to the foaming temperature, in order to prevent uncontrolled foaming, and where all rolls can be set individually to temperatures of 30 to 220° C.

In order to improve the transfer characteristics of the shaped composition layer from one roll to another, it is also possible to use anti-adhesively finished rolls or patterned rolls. In order to produce a sufficiently precisely shaped adhesive film, the peripheral speeds of the rolls may have differences.

The preferred 4-roll applicator is formed by a metering roll, a doctor roll, which determines the thickness of the layer on the carrier material and is arranged parallel to the metering roll, and a transfer roll disposed beneath the metering roll. At the lay-on roll, which together with the transfer roll forms a second roll gap, the composition and the material in sheet form are brought together.

Depending on the nature of the carrier material in sheet form which is to be coated, coating can be effected in a co-rotational or counter-rotational process.

The shaping system may also be formed by a gap formed between a roll and a fixed doctor. The fixed doctor may be a knife-type doctor or else a stationary (half-)roll.

In an alternative production process, all constituents of the adhesive composition are dissolved in a solvent mixture (benzine/toluene/acetone). The microballoons are converted to a slurry in benzine and stirred into the dissolved adhesive composition. For this purpose, it is possible in principle to use the known compounding and stirring units, and it should be ensured that the microballoons do not expand in the course of mixing. As soon as the microballoons are distributed homogeneously in the solution, the adhesive composition can be coated, for which it is again possible to use prior art coating systems. For example, the coating can be accomplished by means of a doctor blade onto a conventional PET liner. In the next step, the adhesive composition layer thus produced is dried at 100° C. for 15 min. In none of the aforementioned steps is there any expansion of the microballoons.

The non-extensible film layer F is laminated onto the free surface of the adhesive composition layer thus produced and dried. Laminated on the second surface thereof is the free surface of a second, likewise dried adhesive composition layer produced in this way, so as to result in an unfoamed three-layer composite composed of the inner film layer and two adhesive composition layers provided with liners.

Alternatively, the film layer F can be directly coated simultaneously or subsequently with the unfoamed adhesive compositions that have been provided with microballoons, and then these still-exposed adhesive composition layers are dried at 100° C. for 15 min and then covered with liners, so as to result in the unfoamed three-layer composite.

After the drying, the adhesive layers are foamed in the oven within an appropriate temperature/time window, for instance at 150° C. for 5 min or at 170° C. for 1 min, specifically covered between the two liners, in order to produce a particularly smooth surface.

The surface thus produced has a roughness $R_a$ of less than 15 μm, more preferably less than 10 μm, most preferably less than 3 μm.

The surface roughness $R_a$ is a unit for the industrial standard for the quality of the final surface processing and constitutes the average height of the roughness, especially the average absolute distance from the center line of the roughness profile within the range of evaluation. In other words, $R_a$ is the arithmetic mean roughness, i.e. the arithmetic mean of all profile values in the roughness profile. $R_a$ is measured by means of laser triangulation.

The expansion temperature chosen is especially higher than the drying temperature in order to avoid the expansion of the microballoons in the course of drying.

The invention is elucidated in detail hereinafter by a few examples. With reference to the examples described hereinafter, particularly advantageous embodiments of the invention will be elucidated in detail, without any intention to unnecessarily restrict the invention thereby.

EXAMPLES

There follows a description of the production of pressure-sensitive adhesive strips of the invention, comprising a film carrier composed of PET with different thickness and self-adhesive composition layers (SACL) with a different microballoon content of EXPANCEL® 920 DU20 expandable plastic microballoons. For this purpose, first of all, a 40% by weight adhesive solution in benzine/toluene/acetone was produced from 50.0% by weight of KRATON® D1102AS, 45.0% by weight of DERCOLYTET™ A115 polyterpene resin, 4.5% by weight of WINGTACK® 10 hydrocarbon resin and 0.5% by weight of IRGANOX® 1010 aging stabilizer. The proportions by weight of the dissolved constituents are each based on the dry weight of the resulting solution. Said constituents of the adhesive composition are characterized as follows:

Kraton D1102AS: styrene-butadiene-styrene triblock copolymer from Kraton Polymers with 17% by weight of diblock, block polystyrene content: 30% by weight DERCOLYTET™ A 115: solid α-pinene tackifying resin with a ring and ball softening temperature of 115° C. and a DACP of 35° C.

WINGTACK® 10: liquid hydrocarbon resin from Cray Valley

IRGANOX® 1010: pentaerythritol tetrakis(3-(3,5-di-tert-butyl-4-hydroxyphenyl)propionate) from BASF SE The solution was subsequently admixed with 1% by weight, 2% by weight or 3% by weight of unexpanded microballoons, using the microballoons in the form of a slurry in benzine. The proportions by weight of the microballoons are based here in each case on the dry weight of the solution used to which they have been added (i.e. the dry weight of the solution used is fixed at 100%). The microballoons in each case were EXPANCEL® 920 DU20 expandable plastic microballoons. The mixture obtained was then coated with a coating bar onto a PET liner provided with a silicone release agent in the desired layer thickness, then the solvent was evaporated off at 100° C. for 15 min and so the composition layer was dried.

A non-extensible film layer of PET was laminated onto the free surface of the adhesive composition layer thus produced and dried, where the film had a thickness of 12 μm, 36 μm or 50 μm (the PET films of said thicknesses are each sold under the Tenolan OCN™ brand by the manufacturer Fatra). The tensile strength of the 12 μm-thick PET film was 210 N/mm² in longitudinal direction and 210 N/mm² in transverse direction. The elongation at break of the 12 μm-thick film was 124% in longitudinal direction and 147% in transverse direction. The tensile strength of the 36 μm-thick PET film was 152 N/mm² in longitudinal direction and 161 N/mm² in transverse direction. The elongation at break of the 36 μm-thick film was 145% in longitudinal direction and 83% in transverse direction. The tensile strength of the 50 μm-thick PET film was 151 N/mm² in longitudinal direction and 160 N/mm² in transverse direction. The elongation at break of the 50 μm-thick film was 148% in longitudinal direction and 81% in transverse direction.

Laminated on the second surface thereof was the free surface of a second, likewise dried adhesive composition layer produced in an identical manner, so as to result in an unfoamed symmetric three-layer composite composed of the inner film layer and two adhesive composition layers provided with liners. The three-layer composite accordingly firstly has, in relation to the composition of the layers, a symmetric construction, in that the two adhesive composition layers adjoining the film layer are chemically identical. Secondly, the three-layer composite accordingly has a structurally symmetric construction, in that the two adhesive composition layers adjoining the film layer are of equal thickness and have the same density.

After drying, the adhesive layers between the two liners were foamed in an oven at 150° C. for 5 min, which resulted in pressure-sensitive adhesive strips of the invention each having a thickness of about 150 μm (examples 1 to 9). The thickness of about 150 μm was obtainable in each case through suitable selection of the coat thickness of the adhesive composition comprising the unexpanded microballoons in the production process. The thickness is based on the pressure-sensitive adhesive strips of the invention, i.e. without PET liner.

Through the foaming between two liners, products having particularly smooth surfaces are obtainable. All the examples adduced have an $R_a$ value of less than 15 μm. By die-cutting, pressure-sensitive adhesive strips with the desired dimensions were obtained.

For comparison, in addition, corresponding pressure-sensitive adhesive strips—but without a non-extensible film layer—were produced, i.e. pressure-sensitive adhesive strips consisting of a single self-adhesive composition layer of the invention with 1% by weight, 2% by weight or 3% by weight of EXPANCEL® 920 DU20 expandable plastic microballoons. The proportions by weight of the microballoons are based here in each case on the dry weight of the adhesive solution to which they have been added in the production process (i.e. the dry weight of the solution used is fixed at 100%). The self-adhesive composition layers were thus chemically identical to those of examples 1 to 9. In these cases, rather than a non-extensible film layer, a second PET liner as described above was laminated in each case onto the free surface of the dried adhesive composition layer produced and the adhesive composition layer was then foamed between the two liners in an oven at 150° C. for 5 min. Through the foaming between two liners, here too, products having particularly smooth surfaces are obtainable (with Ra values less than 15 μm). By die-cutting, pressure-sensitive adhesive strips with the desired dimensions were obtained (comparative examples 1 to 3). The pressure-sensitive adhesive strips without a non-extensible film layer were likewise produced such that they had a thickness of about 150 μm. Here too, the thickness is based on the pressure-sensitive adhesive strips without PET liner.

In addition, likewise for comparison, a pressure-sensitive adhesive strip was produced that differed from the pressure-sensitive adhesive strip of the invention from example 5 merely in that, rather than a non-extensible film layer of PET of thickness 36 μm, an extensible polyurethane film carrier having a comparable thickness of 30 μm was used (comparative example 4). The elongation at break of the polyurethane film carrier both in longitudinal direction and in transverse direction was more than 300%. Production was effected analogously to the pressure-sensitive adhesive strip of the invention from example 5. The resulting pressure-sensitive adhesive strip likewise had a thickness of about 150 μm. Here too, the thickness is based on the pressure-sensitive adhesive strip without PET liner.

Table 1 below shows the shock resistances of the pressure-sensitive adhesive strips of the invention with a PET film carrier as examples 1 to 9, the pressure-sensitive adhesive strips without a film carrier as comparative examples 1 to 3, and the pressure-sensitive adhesive strip with a polyurethane film carrier as comparative example 4.

TABLE 1

Shock resistances of inventive pressure-sensitive adhesive strips and comparative examples.

| Experiment | PET film thickness (μm) | Micro-balloon content (% by wt.) | SACL density[1] (kg/m³) | Ball drop (cm) | Impact resistance[2] (J) | Push-out (N) |
|---|---|---|---|---|---|---|
| Example 1 | 12 | 1 | 830 | 45 | 0.81 | 182 |
| Example 2 | 36 | 1 | 822 | 25 | 0.75 | 170 |
| Example 3 | 50 | 1 | 815 | 25 | 0.72 | 133 |
| Comparative example 1 | none | 1 | 820 | 85 | 1.04 | 182 |
| Example 4 | 12 | 2 | 720 | 185 | 1.12 | 140 |
| Example 5 | 36 | 2 | 720 | 225 | 1.18 | 134 |
| Example 6 | 50 | 2 | 725 | 125 | 0.97 | 131 |
| Comparative example 2 | none | 2 | 715 | 165 | 1.10 | 163 |
| Example 7 | 12 | 3 | 603 | 165 | 0.96 | 127 |
| Example 8 | 36 | 3 | 618 | 125 | 0.78 | 118 |
| Example 9 | 50 | 3 | 611 | 145 | 0.69 | 93 |
| Comparative example 3 | none | 3 | 610 | 185 | 0.97 | 136 |
| Comparative example 4 | 30 (PU film) | 2 | 718 | 145 | 0.93 | 140 |

[1]SACL = self-adhesive composition layer;
[2]in z direction

The table shows that the pressure-sensitive adhesive strips of the invention have very good shock resistances, especially high ball drop values, impact resistances in z direction and push-out resistances. What is noticeable is that microballoon contents in the self-adhesive composition layers of 2% by weight, which results in an absolute density of the self-adhesive composition layers of 720 kg/m³, lead to pressure-sensitive adhesive strips having particularly good shock resistances. Excellent shock resistances are possessed especially by the pressure-sensitive adhesive strips from examples 4 and 5, wherein the thickness of the PET film is 12 μm and 36 μm respectively.

The inventive pressure-sensitive adhesive strip from example 5 comprising a PET carrier also surprisingly has distinctly improved shock resistance over the pressure-sensitive adhesive strip from comparative example 4 comprising a polyurethane carrier with comparable thickness. This is manifested especially by an elevated ball drop value and an elevated impact resistance in z direction. It is thus obviously a feature of inventive pressure-sensitive adhesive strips having a non-extensible film carrier that they have improved shock resistances over noninventive pressure-sensitive adhesive strips having an extensible film carrier, i.e. a film carrier having an elongation at break of at least 300% both in longitudinal direction and in transverse direction.

In further experiments, the effect of the size of the voids formed by microballoons (MB) in self-adhesive composition layers on the shock resistance thereof was tested. Likewise tested was the effect of the content of microballoons in self-adhesive composition layers or of the density that can be established as a result in self-adhesive composition layers on the shock resistance thereof. The self-adhesive composition layers were produced analogously to those of comparative examples 1 to 3, with variation in the content and type of the microballoons. The types of microballoons used were, as well as EXPANCEL® 920 DU20, also EXPANCEL® 920 DU40, EXPANCEL® 920 DU80 and EXPANCEL® 920 DU120. The self-adhesive composition layers were likewise produced such that they had a thickness of about 150 μm. Here too, the thickness is based on the self-adhesive composition layers without PET liner.

Table 2 below shows the shock resistances of the self-adhesive composition layers as comparative examples 1 to 3 and 5 to 15.

The experiments show that those self-adhesive composition layers that have been produced using the comparatively small microballoons EXPANCEL® 920 DU20 and EXPANCEL® 920 DU40 have significantly higher shock resistances than those self-adhesive composition layers that have been produced using the comparatively large microballoons EXPANCEL® 920 DU80 and EXPANCEL® 920 DU120.

The experiments also show that the highest shock resistances can be achieved in the self-adhesive composition layers with microballoon contents of about 1.5% to about 2.5% by weight.

TABLE 2

Shock resistances of self-adhesive composition layers usable in pressure-sensitive adhesive strips of the invention.

| Experiment | MB[1] type | MB[1] content (% by wt.) | SACL density[2] (kg/m³) | Ball drop (cm) | Impact resistance[3] (J) | Impact resistance[4] (J) |
|---|---|---|---|---|---|---|
| Comparative example 1 | DU20 | 1.0 | 820 | 85 | 1.04 | 0.73 |
| Comparative example 2 | DU20 | 2.0 | 715 | 165 | 1.10 | 0.77 |
| Comparative example 3 | DU20 | 3.0 | 610 | 185 | 0.97 | 1.22 |
| Comparative example 5 | DU20 | 2.3 | 656 | 185 | 1.45 | 1.22 |
| Comparative example 6 | DU20 | 3.3 | 590 | 145 | 1.21 | 1.06 |
| Comparative example 7 | DU40 | 0.9 | 723 | 85 | 1.24 | 0.80 |
| Comparative example 8 | DU40 | 2.0 | 630 | 125 | 1.13 | 0.80 |
| Comparative example 9 | DU40 | 3.0 | 567 | 85 | 0.85 | 0.64 |
| Comparative example 10 | DU80 | 1.5 | 652 | 85 | 1.00 | 0.72 |
| Comparative example 11 | DU80 | 2.0 | 639 | 105 | 0.97 | 0.70 |
| Comparative example 12 | DU80 | 3.0 | 522 | 85 | 0.75 | 0.60 |
| Comparative example 13 | DU120 | 0.5 | 788 | 25 | 0.75 | 0.61 |
| Comparative example 14 | DU120 | 0.9 | 667 | 25 | 0.97 | 0.75 |
| Comparative example 15 | DU120 | 2.0 | 530 | 85 | 0.81 | 0.57 |

[1]MB = microballoons;
[2]SACL = self-adhesive composition layer;
[3]in z direction;
[4]in the x, y plane It is also noticeable that, in general, the highest shock resistances can be achieved in the self-adhesive composition layers when the absolute density of the self-adhesive composition layers is within the range from 600 to 750 kg/m³, for example 600 to 700 kg/m³.

On the basis of these results, the self-adhesive composition layers used in the pressure-sensitive adhesive strips of the invention are those that have been foamed using comparatively small microballoons, for example EXPANCEL® 920 DU20 or EXPANCEL® 920 DU40. Moreover, it is advisable to use, in the pressure-sensitive adhesive strips of the invention, self-adhesive composition layers having microballoon contents of about 1.5% to about 2.5% by weight and/or an absolute density of 600 to 750 kg/m³, for example 600 to 700 kg/m³.

Test Methods

Unless stated otherwise, all measurements were conducted at 23° C. and 50% rel. air humidity.

The mechanical and adhesive data were ascertained as follows:

Elongation at Break, Tensile Strength (Test Method R1)

Elongation at break and tensile strength were measured in accordance with DIN 53504 using dumbbell specimens of size S3 at a separation speed of 300 mm per min. The test conditions were 23° C. and 50% rel. air humidity.

Modulus of Elasticity

Modulus of elasticity indicates the mechanical resistance that the material offers to elastic deformation. It is determined as the ratio of the strain σ required to the elongation ε achieved, where ε is the quotient of the change in length ΔL and the length $L_0$ in Hooke's regime of deformation of the specimen. The definition of the modulus of elasticity is elucidated, for example, in the Taschenbuch der Physik [Physics Handbook] (H. Stöcker (ed.), Taschenbuch der Physik, 2nd ed., 1994, Verlag Harri Deutsch, Frankfurt, p. 102-110).

To determine the modulus of elasticity of a film, the tensile strain characteristics were ascertained using a type 2 specimen (rectangular test film strip of length 150 mm and width 15 mm) according to DIN EN ISO 527-3/2/300 with a test speed of 300 mm/min, a clamping length of 100 mm and an initial force of 0.3 N/cm, the test strip for ascertainment of the data having been cut to size with sharp blades. A ZWICK® tensile tester (model Z010) was used. Tensile strain characteristics were measured in machine direction (MD). A 1000 N (Zwick Roell Kap-Z 066080.03.00) or 100 N (Zwick Roell Kap-Z 066110.03.00) load cell was used. Modulus of elasticity was ascertained by graphical means from the measurement curves by determining the slope of the starting region of the curve which is characteristic of the behavior in respect of Hooke's Law and was reported in GPa.

DACP 5.0 g of test substance (the tackifying resin sample to be examined) are weighed into a dry test tube, and 5.0 g of xylene (isomer mixture, CAS [1330-20-7], ≥98.5%, Sigma-Aldrich #320579 or comparable) are added. The test substance is dissolved at 130° C. and then cooled down to 80° C. Any xylene that escapes is made up for with fresh xylene, such that 5.0 g of xylene are present again. Subsequently, 5.0 g of diacetone alcohol (4-hydroxy-4-methyl-2-pentanone, CAS [123-42-2], 99%, Aldrich #H41544 or comparable) are added. The test tube is shaken until the test substance has dissolved completely. For this purpose, the solution is heated to 100° C. The test tube containing the resin solution is then introduced into a NOVOMATICS CHEMOTRONIC COOL™ cloud point measuring instrument and heated therein to 110° C. It is cooled down at a cooling rate of 1.0 K/min. The cloud point is detected optically. For this purpose, that temperature at which the turbidity of the solution is 70% is registered. The result is reported in ° C. The lower the DACP value, the higher the polarity of the test substance.

Tackifying Resin Softening Temperature

The tackifying resin softening temperature is conducted by the relevant methodology, known as ring & ball and standardized in ASTM E28.

Diameter

The mean diameter of the voids formed by the microballoons in a self-adhesive composition layer is determined using cryofracture edges of the pressure-sensitive adhesive strip in a scanning electron microscope (SEM) with 500-fold magnification. The diameter of the microballoons in the self-adhesive composition layer to be examined that are visible in scanning electron micrographs of 5 different cryofracture edges of the pressure-sensitive adhesive strip is determined in each case by graphical means, and the arithmetic mean of all the diameters ascertained in the 5 scanning electron micrographs constitutes the mean diameter of the voids formed by the microballoons in the self-adhesive composition layer in the context of the present application. The diameters of the microballoons visible in the micrographs are determined by graphical means in such a way that the maximum extent in any (two-dimensional) direction is inferred from the scanning electron micrographs for each individual microballoon in the self-adhesive composition layer to be examined and regarded as the diameter thereof.

Density

The density of the unfoamed and foamed adhesive composition layers is ascertained by forming the quotient of mass applied and thickness of the adhesive composition layer applied to a carrier or liner.

The mass applied can be determined by determining the mass of a section, defined in terms of its length and width, of such an adhesive composition layer applied to a carrier or liner, minus the (known or separately determinable) mass of a section of the same dimensions of the carrier or liner used.

The thickness of an adhesive composition layer can be determined by determining the thickness of a section, defined in terms of its length and width, of such an adhesive composition layer applied to a carrier or liner, minus the (known or separately determinable) thickness of a section of the same dimensions of the carrier or liner used. The thickness of the adhesive composition layer can be determined by means of commercial thickness measuring instruments (caliper test instruments) with accuracies of less than a 1 μm deviation. If variations in thickness are found, the mean of measurements at at least three representative sites is reported, i.e. more particularly not measured at creases, folds, specks and the like.

Thickness

Like the thickness for an adhesive composition layer as above, it is also possible to ascertain the thickness of a pressure-sensitive adhesive strip or a film carrier layer by means of commercial thickness measuring instruments (caliper test instruments) with accuracies of less than a 1 μm deviation. If variations in thickness are found, the mean of measurements at at least three representative sites is reported, i.e. more particularly not measured at creases, folds, specks and the like.

Static Glass Transition Temperature $T_g$

Glass transition points—referred to synonymously as glass transition temperatures—are reported as the result of measurements by means of differential scanning calorimetry (DSC) according to DIN 53 765, especially sections 7.1 and 8.1, but with uniform heating and cooling rates of 10 K/min in all heating and cooling steps (cf. DIN 53 765; section 7.1; note 1). The sample weight is 20 mg.

Ball Drop Test (Impact Resistance)

A square sample in the shape of a frame was cut out of the adhesive tape to be examined (external dimensions 33 mm×33 mm; border width 2.0 mm; internal dimensions (window cut-out) 29 mm×29 mm). This sample was stuck to an ABS frame (external dimensions 45 mm×45 mm; border width 10 mm; internal dimensions (window cut-out) 25 mm×25 mm; thickness 5 mm). A PMMA window of 35 mm×35 mm was stuck to the other side of the double-sided adhesive tape. The bonding of ABS frame, adhesive tape frame and PMMA window was effected such that the geometric centers and the diagonals were each superimposed on one another (corner-to-corner). The bonding area was 248 mm². The bond was subjected to a pressure of 248 N for 5 s and stored under conditions of 23° C./50% relative humidity for 24 hours.

Immediately after the storage, the adhesive composite composed of ABS frame, adhesive tape and PMMA sheet was placed by the protruding edges of the ABS frame onto a framework (sample holder) such that the composite was aligned horizontally and the PMMA sheet faced downward in a freely suspended manner. A steel ball (weight 32.6 g) was allowed to drop vertically from a height of 25 cm (through the window of the ABS frame) centered onto the PMMA sheet in the sample thus arranged (test conditions 23° C., 50% relative humidity). Three tests were conducted with each sample, if the PMMA sheet had not become detached beforehand. The ball drop test is considered to have been passed if the bond did not part in any of the three tests. The height from which the weight dropped, in each case using a new sample, was increased in 20 cm steps until the bond (in at least one of the three tests) was parted. The drop heights reported for the double-sided adhesive tapes tested in the application relate to the last height at which the test is still passed.

Push-Out Resistance (Z Plane)

By means of the push-out test, it is possible to obtain conclusions as to how high the stability of a bond of a component is in a frame-like body, for example a window in a housing.

A rectangular sample in the shape of a frame was cut out of the adhesive tape to be examined (external dimensions 43 mm×33 mm; border width in each case 2.0 mm; internal dimensions (window cut-out) 39 mm×29 mm, bond area on the top and bottom side 288 mm² in each case). This sample was bonded to a rectangular ABS polymer frame (ABS=acrylonitrile-butadiene-styrene copolymers) (external dimensions 50 mm×40 mm, border width of each of the long borders 8 mm; border width of each of the short borders 10 mm; internal dimensions (window cut-out) 30 mm×24 mm; thickness 3 mm). A rectangular PMMA sheet (PMMA=polymethylmethacrylate) with dimensions of 45 mm×35 mm was bonded to the other side of the sample of the double-sided adhesive tape. The full available bonding area of the adhesive tape was utilized. The bonding of ABS frame, adhesive tape sample and PMMA window was effected such that the geometric centers, the angle bisectors of the acute diagonal angles and the angle bisectors of the obtuse diagonal angles of the rectangles were each superimposed on one another (corner-to-corner, long sides on long sides, short sides on short sides). The bonding area was 288 mm². The bond was subjected to a pressure of 10 bar for 5 s and stored under conditions of 23° C./50% relative humidity for 24 hours.

Immediately after the storage, the adhesive composite composed of ABS frame, adhesive tape and PMMA sheet was placed by the protruding edges of the ABS frame onto a framework (sample holder) such that the composite was aligned horizontally and the PMMA sheet faced downward in a freely suspended manner.

A pressure ram is then moved vertically upward through the window of the ABS frame at a constant speed of 10 mm/min, such that it presses onto the center of the PMMA sheet, and the respective force (determined from the respective pressure and contact area between the ram and sheet) is registered as a function of the time from the first contact of the ram with the PMMA sheet until just before it drops away (test conditions: 23° C., 50% relative humidity). The force acting immediately prior to the failure of the adhesive bond between PMMA sheet and ABS frame (maximum force $F_{max}$ in the force-time diagram in N) is registered as the response of the push-out test.

Impact Resistance; Z Direction

A square sample in the shape of a frame was cut out of the adhesive tape to be examined (external dimensions 33 mm×33 mm; border width 2.0 mm; internal dimensions (window cut-out) 29 mm×29 mm). This sample was stuck to a PC frame (external dimensions 45 mm×45 mm; border width 10 mm; internal dimensions (window cut-out) 25 mm×25 mm; thickness 3 mm). A PC window of 35 mm×35 mm was stuck to the other side of the double-sided adhesive tape. The bonding of PC frame, adhesive tape frame and PC window was effected such that the geometric centers and the diagonals were each superimposed on one another (corner-to-corner). The bonding area was 248 mm². The bond was subjected to a pressure of 248 N for 5 s and stored under conditions of 23° C./50% relative humidity for 24 hours.

Immediately after the storage, the adhesive composite composed of PC frame, adhesive tape and PC window was braced by the protruding edges of the PC frame in a sample holder such that the composite was aligned horizontally and the PC window was beneath the frame. The sample holder was then inserted centrally into the intended receptacle of the "DUPONT® Impact Tester". The impact head of weight 190 g was used in such a way that the circular impact geometry with a diameter of 20 mm impacted centrally and flush on the window side of the PC window.

A weight having a mass of 150 g guided on two guide rods was allowed to drop vertically from a height of 5 cm onto the composite composed of sample holder, sample and impact head thus arranged (test conditions: 23° C., 50% relative humidity). The height from which the weight dropped was increased in 5 cm steps until the impact energy introduced destroyed the sample as a result of the impact stress and the PC window parted from the PC frame.

In order to be able to compare experiments with different samples, the energy was calculated as follows:

$$E[J] = \text{height [m]} * \text{mass of weight [kg]} * 9.81 \text{ m/s}^2$$

Five samples per product were tested, and the mean energy was reported as index for impact resistance.

Transverse Impact Resistance; X,Y Plane

A square sample in the shape of a frame was cut out of the adhesive tape to be examined (external dimensions 33 mm×33 mm; border width 2.0 mm; internal dimensions (window cut-out) 29 mm×29 mm). This sample was stuck to a PC frame (external dimensions 45 mm×45 mm; border width 10 mm; internal dimensions (window cut-out) 25 mm×25 mm; thickness 3 mm). A PC window of 35 mm×35 mm was stuck to the other side of the double-sided adhesive tape. The bonding of PC frame, adhesive tape frame and PC window was effected such that the geometric centers and the diagonals were each superimposed on one another (corner-to-corner). The bonding area was 248 mm². The bond was subjected to a pressure of 248 N for 5 s and stored under conditions of 23° C./50% relative humidity for 24 hours.

Immediately after the storage, the adhesive composite composed of PC frame, adhesive tape and PC sheet was braced by the protruding edges of the PC frame in a sample holder such that the composite was aligned vertically. The sample holder was then inserted centrally into the intended receptacle of the "DUPONT® Impact Tester". The impact head of weight 300 g was used in such a way that the rectangular impact geometry with dimensions of 20 mm×3 mm impacted centrally and flush on the end face of the PC window facing upward.

A weight having a mass of 150 g guided on two guide rods was allowed to drop vertically from a height of 5 cm onto the composite composed of sample holder, sample and impact head thus arranged (test conditions: 23° C., 50% relative humidity). The height from which the weight dropped was increased in 5 cm steps until the impact energy introduced destroyed the sample as a result of the transverse impact stress and the PC window parted from the PC frame.

In order to be able to compare experiments with different samples, the energy was calculated as follows:

$$E[J] = \text{height [m]} * \text{mass of weight [kg]} * 9.81 \text{ kg/m}*\text{s}^2$$

Five samples per product were tested, and the mean energy was reported as index for transverse impact resistance.

The invention claimed is:

1. A pressure-sensitive adhesive strip comprising:
   inner layer F comprising a non-extensible film carrier, a first surface, and a second surface;
   layer SK1 comprising a first self-adhesive composition disposed on the first surface; and
   layer SK2 comprising a second self-adhesive composition disposed on the second surface,
   wherein:
   the first self-adhesive composition is based on a first vinylaromatic block copolymer composition foamed with a first plurality of microballoons;
   the second self-adhesive composition is based on a second vinylaromatic block copolymer composition foamed with a second plurality of microballoons;
   the first plurality of microballoons forms a first plurality of voids having a first mean diameter of 20 to 60 μm;
   the second plurality of microballoons forms a second plurality of voids having a second mean diameter of 20 to 60 μm; and
   inner layer F has a tensile strength in a longitudinal direction of greater than 100 N/mm² and/or a tensile strength in a transverse direction of greater than 100 N/mm².

2. The pressure-sensitive adhesive strip as claimed in claim 1, wherein the first vinylaromatic block copolymer composition and the second vinylaromatic block copolymer composition are chemically identical.

3. The pressure-sensitive adhesive strip as claimed in claim 1, wherein layer SK1 and layer SK2 have the same thickness and/or have the same density.

4. The pressure-sensitive adhesive strip as claimed in claim 1, wherein:
   layer SK1 comprises 20 to 75% by weight of a first at least one vinylaromatic block copolymer based on the total weight of layer SK1; and
   layer SK2 comprises 20 to 75% by weight of a second at least one vinylaromatic block copolymer based on the total weight of layer SK2.

5. The pressure-sensitive adhesive strip as claimed in claim 1, wherein:
   layer SK1 is formed from a first at least one vinylaromatic block copolymer and a first tackifying resin; and/or
   layer SK2 is formed from a second at least one vinylaromatic block copolymer and a second tackifying resin.

6. The pressure-sensitive adhesive strip as claimed in claim 5, wherein:
   layer SK1 comprises 20 to 60% by weight of the first tackifying resin based on the total weight of layer SK1; and/or
   layer SK2 comprises 20 to 60% by weight of the second tackifying resin based on the total weight of layer SK2.

7. The pressure-sensitive adhesive strip as claimed in claim 1, wherein:
   the first plurality of microballoons is present at up to 12% by weight based on the total weight of layer SK1; and/or
   the second plurality of microballoons is present at up to 12% by weight based on the total weight of layer SK2.

8. The pressure-sensitive adhesive strip as claimed in claim 1, wherein:
   the first mean diameter is 20 to 50 μm; and/or
   the second mean diameter is 20 to 50 μm.

9. The pressure-sensitive adhesive strip as claimed in claim 1, wherein layer SK1 consists of:
   a first at least one vinylaromatic block copolymer present at 20 to 75% by weight based on the total weight of layer SK1;
   a first at least one tackifying resin present at 24.6 to 60% by weight based on the total weight of layer SK1;
   the first plurality of microballoons is present at 0.2 to 10% by weight based on the total weight of layer SK1; and
   a first at least one additive present at 0.2 to 10% by weight based on the total weight of layer SK1,
   and/or layer SK2 consists of:
   a second at least one vinylaromatic block copolymer present at 20 to 75% by weight based on the total weight of layer SK2;
   a second at least one tackifying resin present at 24.6 to 60% by weight based on the total weight of layer SK2;
   the second plurality of microballoons is present at 0.2 to 10% by weight based on the total weight of layer SK2; and
   a second at least one additive present at 0.2 to 10% by weight based on the total weight of layer SK2.

10. The pressure-sensitive adhesive strip as claimed in claim 1, wherein layer SK1 consists of:

a first at least one vinylaromatic block copolymer present at 35 to 65% by weight based on the total weight of layer SK1;
a first tackifying resin present at 34.6 to 45% by weight based on the total weight of layer SK1;
the first plurality of microballoon is present at 0.2 to 10% by weight based on the total weight of layer SK1; and
a first at least one additive present at 0.2 to 10% by weight based on the total weight of layer SK1,
and/or layer SK2 consists of:
a second at least one vinylaromatic block copolymer present at 35 to 65% by weight based on the total weight of layer SK2;
a second tackifying resin present at 34.6 to 45% by weight based on the total weight of layer SK2;
the second plurality of microballoons is present at 0.2 to 10% by weight based on the total weight of layer SK2; and
a second at least one additive present at 0.2 to 10% by weight based on the total weight of layer SK2.

11. The pressure-sensitive adhesive strip as claimed in claim 1, wherein layer SK1 consists of:
a first at least one vinylaromatic block copolymer present at 30 to 75% by weight based on the total weight of layer SK1;
a first at least one tackifying resin present at 24.8 to 60% by weight based on the total weight of layer SK1; and
the first plurality of microballoons is present at 0.2 to 10% by weight based on the total weight of layer SK1,
and/or layer SK2 consists of:
a second at least one vinylaromatic block copolymer is present at 30 to 75% by weight based on the total weight of layer SK2;
a second at least one tackifying resin present at 24.8 to 60% based on the total weight by weight of layer SK2; and
the second plurality of microballoons is present at 0.2 to 10% by weight based on the total weight of layer SK2.

12. The pressure-sensitive adhesive strip as claimed in claim 1, wherein:
layer SK1 has an absolute density of 400 to 990 kg/m$^3$ and/or a relative density of 0.35 to 0.99; and/or
layer SK2 has an absolute density of 400 to 990 kg/m$^3$ and/or a relative density of 0.35 to 0.99.

13. The pressure-sensitive adhesive strip as claimed in claim 1, wherein:
layer SK1 has a thickness between 20 and 200 µm; and/or
layer SK2 has a thickness between 20 and 200 µm.

14. The pressure-sensitive adhesive strip as claimed in claim 1, wherein:
the first surface has been physically and/or chemically pretreated; and/or
the second surface has been physically and/or chemically pretreated.

15. The pressure-sensitive adhesive strip as claimed in claim 14, wherein:
the first surface has been etched, treated with a corona, and/or treated with a primer; and/or
the second surface has been etched, treated with a corona, and/or treated with a primer.

16. The pressure-sensitive adhesive strip as claimed in claim 1, wherein inner layer F comprises at least one polyester.

17. The pressure-sensitive adhesive strip as claimed in claim 1, wherein inner layer F has a thickness between 5 and 125 µm.

18. The pressure-sensitive adhesive strip as claimed in claim 1, wherein inner layer F has an elongation at break of less than 300%.

19. The pressure-sensitive adhesive strip as claimed in claim 1, wherein the pressure-sensitive adhesive strip has a thickness of 45 to 4000 µm.

20. The pressure-sensitive adhesive strip as claimed in claim 1, wherein:
the first plurality of microballoons is present at 1.5 to 2.5% by weight based on
the total weight of layer SK1; and/or
the second plurality of microballoons is present at 1.5 to 2.5% by weight based on the total weight of layer SK2.

21. The pressure-sensitive adhesive strip as claimed in claim 1, wherein:
the first self-adhesive composition has an absolute density of 600 to 750 kg/m$^3$; and/or
the second self-adhesive composition has an absolute density of 600 to 750 kg/m$^3$.

22. A method comprising applying a pressure-sensitive adhesive strip according to claim 1 to a substrate.

* * * * *